US012724276B2

(12) United States Patent
Connor

(10) Patent No.: US 12,724,276 B2
(45) Date of Patent: Sep. 1, 2026

(54) AUGMENTED REALITY (OR MIXED REALITY) EYEWEAR WITH MULTIPLE IMAGE DISPLAYS PER EYE

(71) Applicant: Robert A. Connor, Wyoming, MN (US)

(72) Inventor: Robert A. Connor, Wyoming, MN (US)

(73) Assignee: Holovisions LLC, Ham Lake, MN (US)

( * ) Notice: Subject to any disclaimer, the term of this patent is extended or adjusted under 35 U.S.C. 154(b) by 0 days.

(21) Appl. No.: 19/069,077

(22) Filed: Mar. 3, 2025

(65) Prior Publication Data

US 2025/0244587 A1 Jul. 31, 2025

Related U.S. Application Data

(63) Continuation-in-part of application No. 18/827,703, filed on Sep. 7, 2024, now Pat. No. 12,436,394, which is a continuation-in-part of application No. 18/800,091, filed on Aug. 11, 2024, now Pat. No. 12,601,923, application No. 19/069,077 is a continuation-in-part of application No. 18/800,091, filed on Aug. 11, 2024, now Pat. No. 12,601,923, which is a continuation-in-part of application No. 18/586,439, filed on Feb. 24, 2024, now Pat. No. 12,205,231, said application No. 18/827,703 is a continuation-in-part of application No. 18/586,439, filed on Feb. 24, 2024, now Pat. No. 12,205,231, which is a continuation-in-part of application No. 18/088,548, filed on Dec. 24, 2022, now Pat. No. 12,013,538, which is a continuation-in-part of application No. 17/722,354, filed on Apr. 17, 2022, now Pat. No. 11,754,843, which is a continuation-in-part of application No. 17/501,495, filed on Oct. 14, 2021, now Pat. No. 11,307,420, which is a continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a continuation-in-part of application No. 15/942,498, filed on Mar. 31, 2018, now Pat. No. 10,338,400.

(Continued)

(51) Int. Cl.
*G02B 27/01* (2006.01)

(52) U.S. Cl.
CPC ................................ *G02B 27/0172* (2013.01)

(58) Field of Classification Search
CPC ........ G02B 27/0172; G02B 2027/0178; G02B 26/0816
See application file for complete search history.

(56) References Cited

U.S. PATENT DOCUMENTS 11,016,302 B2 5/2021 Freeman et al.
11,561,399 B2 * 1/2023 Kim .................. G02B 27/0103
11,846,781 B2 12/2023 Qin (Continued)

*Primary Examiner* — Collin X Beatty

(57) ABSTRACT

In an example, a compact, dual-display optical structure for each eye of augmented reality eyewear can include: a first image display on a first side of a person's eye; a second image display on a second side of the eye; a first waveguide which reflects light rays from the first image display multiple times before those light rays are directed toward the eye; and a second waveguide which reflects light rays from the second image display multiple times before those light rays are directed toward the eye.

10 Claims, 3 Drawing Sheets

Related U.S. Application Data

(60) Provisional application No. 63/212,054, filed on Jun. 17, 2021, provisional application No. 63/192,664, filed on May 25, 2021, provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep. 27, 2017, provisional application No. 62/561,834, filed on Sep. 22, 2017, provisional application No. 62/528,331, filed on Jul. 3, 2017.

(56) References Cited

U.S. PATENT DOCUMENTS 11,852,818 B2 12/2023 Qin
12,013,536 B2 6/2024 Freeman et al.
12,046,166 B2 7/2024 Kristensson et al.
12,140,764 B2 11/2024 Popovich et al.
12,164,107 B2 12/2024 Qin
12,210,156 B2 1/2025 Freeman et al.
12,235,445 B2 2/2025 Freeman et al.
12,235,446 B2 2/2025 Freeman et al.
2016/0085074 A1* 3/2016 Cheng ...................... G02B 5/04 359/630
2016/0161747 A1* 6/2016 Osterhout ............. G06F 1/1635 345/8
2017/0268853 A1 9/2017 Qin
2017/0269367 A1 9/2017 Qin
2017/0357089 A1* 12/2017 Tervo ................... G02B 6/0026
2019/0339528 A1 11/2019 Freeman et al.
2021/0294119 A1 9/2021 Osmanis et al.
2021/0333557 A1 10/2021 Qin
2021/0382310 A1 12/2021 Freeman et al.
2021/0382311 A1 12/2021 Freeman et al.
2021/0382312 A1 12/2021 Freeman et al.
2021/0389590 A1 12/2021 Freeman et al.
2022/0066222 A1 3/2022 Qin
2022/0082836 A1 3/2022 Qin
2022/0244545 A1 8/2022 Qin
2023/0324688 A1 10/2023 Peng et al.
2023/0393399 A1 12/2023 Odom et al.
2024/0372978 A1 11/2024 Sorahana
2024/0377635 A1 11/2024 Zhou et al.
2024/0393589 A1 11/2024 Blum et al.
2025/0013044 A1 1/2025 De Matos et al.
2025/0028175 A1 1/2025 Qin
2025/0028176 A1 1/2025 Qin
2025/0040412 A1 1/2025 Peng et al.

* cited by examiner 101
104
103
102

201
203
202
204

301
303
305

304
302

401
403
405

404
402

505
502
504
503
501

605
602
607
604
603
606
601

AUGMENTED REALITY (OR MIXED REALITY) EYEWEAR WITH MULTIPLE IMAGE DISPLAYS PER EYE

CROSS-REFERENCE TO RELATED APPLICATIONS

This application is a continuation-in-part of U.S. patent application Ser. No. 18/827,703 filed on 2024 Sep. 7. This application is a continuation-in-part of U.S. patent application Ser. No. 18/800,091 filed on 2024 Aug. 11.

U.S. patent application Ser. No. 18/827,703 was a continuation-in-part of U.S. patent application Ser. No. 18/800,091 filed on 2024 Aug. 11. U.S. patent application Ser. No. 18/827,703 was a continuation-in-part of U.S. patent application Ser. No. 18/586,439 filed on 2024 Feb. 24.

U.S. patent application Ser. No. 18/800,091 was a continuation-in-part of U.S. patent application Ser. No. 18/586,439 filed on 2024 Feb. 24. U.S. patent application Ser. No. 18/586,439 was a continuation-in-part of U.S. patent application Ser. No. 18/088,548 filed on 2022 Dec. 24. U.S. patent application Ser. No. 18/088,548 was a continuation-in-part of U.S. patent application Ser. No. 17/722,354 filed on 2022 Apr. 17. U.S. patent application Ser. No. 17/722,354 was a continuation-in-part of U.S. patent application Ser. No. 17/501,495 filed on 2021 Oct. 14.

U.S. patent application Ser. No. 17/501,495 was a continuation-in-part of U.S. patent application Ser. No. 16/686,170 filed on 2019 Nov. 17. U.S. patent application Ser. No. 17/501,495 claimed the priority benefit of U.S. provisional patent application 63/192,664 filed on 2021 May 25. U.S. patent application Ser. No. 17/501,495 claimed the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. Pat. No. 10,859,834 on 2020 Dec. 8.

U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. Pat. Nos. 10,859,834, 10,338,400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27. U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH: Not Applicable

SEQUENCE LISTING OR PROGRAM: Not Applicable

BACKGROUND

Field of Invention

This invention relates to augmented reality eyewear.

Introduction

Augmented Reality (AR) eyewear allows a person to simultaneously see their environment and virtual objects displayed in their field of vision. Augmented Reality (also called "Mixed Reality") can include simulated interactions between a person and virtual objects in their environment. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports. Although there is considerable potential for augmented reality, there are also substantive challenges. One of the challenges is how to provide good wide-angle views of virtual objects with a compact device. This challenge is addressed by the invention disclosed herein.

Review of the Relevant Art

U.S. patent 170268853 (Qin, Sep. 21, 2017, "Optical Invisible Device") discloses an optical invisible device comprising a first microlens array for imaging, an imaging unit, a display screen, a second microlens array for projecting content displayed by the display screen to the outside, and an image processing unit. U.S. patent 170269367 (Qin, Sep. 21, 2017, "Microlens Array-Based Near-Eye Display (NED)") discloses a microlens array-based near-eye display with a display screen facing the eyes and displaying images, a microlens array located between the display screen and the eyes, an eyeball-tracing camera, and an image processing unit.

U.S. patent application publication 190339528 (Freeman et al., Nov. 7, 2019, "Wearable Image Manipulation and Control System with High Resolution Micro-Displays and Dynamic Opacity Augmentation in Augmented Reality Glasses") and U.S. Pat. No. 1,016,302 (Freeman et al., May 25, 2021, "Wearable Image Manipulation and Control System with High Resolution Micro-Displays and Dynamic Opacity Augmentation in Augmented Reality Glasses") disclose a mixed reality display with a dynamic opacity system. U.S. patent application publication 210294119 (Osmanis et al., Sep. 23, 2021, "Display Apparatus for Rendering Three-Dimensional Image and Method Therefor") discloses a display including an optical combiner having a four sides. U.S. patent application publication 210333557 (Qin, Oct. 28, 2021, "Total Reflection Based Compact Near-Eye Display Device with Large Field of View") and U.S. Pat. No. 2,164,107 (Qin, Dec. 10, 2024, "Total Reflection Based Compact Near-Eye Display Device with Large Field of View") disclose a total reflection based compact near-eye display device with a large field of view.

U.S. patent application publication 210382310 (Freeman et al., Dec. 9, 2021, "Wearable Image Manipulation and Control System with High Resolution Micro-Displays and Dynamic Opacity Augmentation in Augmented Reality Glasses") and U.S. Pat. No. 2,013,536 (Freeman et al., Jun. 18, 2024, "Wearable Image Manipulation and Control System with High Resolution Micro-Displays and Dynamic Opacity Augmentation in Augmented Reality Glasses") disclose a dynamic opacity system which is capable of making at least one pixel opaque in the portion of the at least one lens onto which the one or more images are projected. U.S. patent application publication 210382311 (Freeman et al., Dec. 9, 2021, "Wearable Image Manipulation and Control System with High Resolution Micro-Displays and Dynamic Opacity Augmentation in Augmented Reality Glasses") and U.S. Pat. No. 2,235,446 (Freeman et al., Feb. 25, 2025, "Wearable Image Manipulation and Control System with High Resolution Micro-Displays and Dynamic Opacity Augmentation in Augmented Reality Glasses") disclose a wedge drive comprising a slider element receiving means, a movable slider element, and a driver element, wherein sliding surfaces are provided between the slider element and the driver element, and wherein a dovetail-like or prism guide means is provided between the slider element and the slider element receiving means.

U.S. patent application publication 210382312 (Freeman et al., Dec. 9, 2021, "Wearable Image Manipulation and Control System with High Resolution Micro-Displays and Dynamic Opacity Augmentation in Augmented Reality Glasses") and U.S. Pat. No. 2,210,156 (Freeman et al., Jan. 28, 2025, "Wearable Image Manipulation and Control System with High Resolution Micro-Displays and Dynamic Opacity Augmentation in Augmented Reality Glasses") disclose a mixed reality display with a dynamic opacity system, wherein the dynamic opacity system is capable of making at least one pixel opaque in the portion of the at least one lens onto which the one or more images are projected. U.S. patent application publication 210389590 (Freeman et al., Dec. 16, 2021, "Wearable Image Manipulation and Control System with High Resolution Micro-Displays and Dynamic Opacity Augmentation in Augmented Reality Glasses") discloses a mixed reality display comprising at least one lens, at least one display capable of projecting one or more images onto at least a portion of the at least one lens, and a dynamic opacity system.

U.S. patent application publication 220066222 (Qin, Mar. 3, 2022. "Total Reflection Based Compact Near-Eye Display Device with Large Field of View") discloses transmission of light rays from an image source using a total reflection prism and a near-eye dioptric component. U.S. patent application publication 220082836 (Qin, Mar. 17, 2022, "Thin Near-To-Eye Display Device with Large Field of View Angle") and U.S. Pat. No. 11,852,818 (Qin, Dec. 26, 2023, "Thin Near-To-Eye Display Device with Large Field of View Angle") disclose a thin near-to-eye display device with two or more radial reflection units in front of human eyes. U.S. patent application publication 220244545 (Qin, Aug. 4, 2022, "Thin Type Large Field of View Near-Eye Display Device") and U.S. Pat. No. 1,846,781 (Qin, Dec. 19, 2023, "Thin Type Large Field of View Near-Eye Display Device") disclose a near-eye display device with two or more radial reflection units to generate two or more sub-images which are spliced together into a larger image.

U.S. patent application publication 20230324688 (Peng et al., Oct. 12, 2023, "AR Headset Optical System with Several Display Sources") discloses an augmented reality headset that incorporates a projection engine with two or more displays. U.S. patent application publication 230393399 (Odom et al., Dec. 7, 2023, "Zonal Lenses for a Head-Mounted Display (HMD) Device") discloses an optical element with two or more zones to perform functions in a head-mounted display device. U.S. Pat. No. 2,046,166 (Kristensson et al., Jul. 23, 2024, "Supply of Multi-Layer Extended Reality Images to a User") discloses an apparatus that supplies multi-plane images for viewing via an image generator, an image director, and a first output port. U.S. patent application publication 240372978 (Sorahana, Nov. 7, 2024, "Display Apparatus and Display Method") discloses a display apparatus with a group-of-viewpoints generation system that includes a plurality of three-dimensional image displaying apparatuses corresponding to each of two eyes of a user.

U.S. Pat. No. 2,140,764 (Popovich et al., Nov. 12, 2024, "Wide Angle Waveguide Display") discloses systems and methods for providing waveguide display devices utilizing overlapping integrated dual axis waveguides. U.S. patent application publication 240377635 (Zhou et al., Nov. 14, 2024, "Near-Eye Display Apparatus") discloses a near-eye display device with a first display screen, a second display screen, a third display screen, and an imaging lens group configured to image displayed images of the display screens. U.S. patent application publication 240393589 (Blum et al., Nov. 28, 2024, "See-Through Near Eye Optical Module") discloses a see-through near eye optical module with a sparsely populated near eye display comprising a plurality of pixels or pixel patches and a sparsely populated micro-lens array.

U.S. patent application publication 250013044 (De Matos et al., Jan. 9, 2025, "Head-Wearable Display Device") discloses a head-wearable display device which with a transparent see-through area and a plurality of more than two display segments to emit sub-image portions of a display image. U.S. patent application publication 250028175 (Qin, Jan. 23, 2025, "Total Reflection Based Compact Near-Eye Display Device with Large Field of View") and U.S. patent application publication 250028176 (Qin, Jan. 23, 2025, "Total Reflection Based Compact Near-Eye Display Device with Large Field of View") disclose transmission of light rays from an image source using a total reflection prism and a near-eye refractive component. U.S. patent application publication 250040412 (Peng et al., Jan. 30, 2025, "Display Panel and Near-Eye Display Apparatus") discloses a display panel with a central display region and an angle-customized display region surrounding the central display region.

SUMMARY OF THE INVENTION

A dual display optical structure for an eye of augmented reality eyewear can be more compact than the single display structures in the prior art. In an example, an optical structure for each eye of augmented reality eyewear can include: a first image display on a first side of a person's eye; a second image display on a second side of the eye which is opposite the first side of the eye, wherein light rays from the first image display and light rays from the second image display show one or more virtual objects in the person's field of view; a first waveguide which reflects light rays from the first image display multiple times before those light rays are directed toward the eye; and a second waveguide which reflects light rays from the second image display multiple times before those light rays are directed toward the eye; wherein light rays from the environment pass through the first waveguide and/or the second waveguide to reach the eye.

In an example, a first side can be above (a space in front of) the eye and the second side can be below (the space in front of) the eye. In an example, a first side can be to the right of (a space in front of) the eye and the second side can be to the left of (the space in front of) the eye. In an example, the waveguide can be tapered. In an example, light beams from a first image display and light beams from a second image display can combine to show one or more virtual objects and/or scenes in a person's field of view. In an example, light beams from a first image display and light beams from a second image display can show different virtual objects and/or scenes in a person's field of view.

BRIEF INTRODUCTION TO THE FIGURES

DETAILED DESCRIPTION OF THE FIGURES

Figure 1:
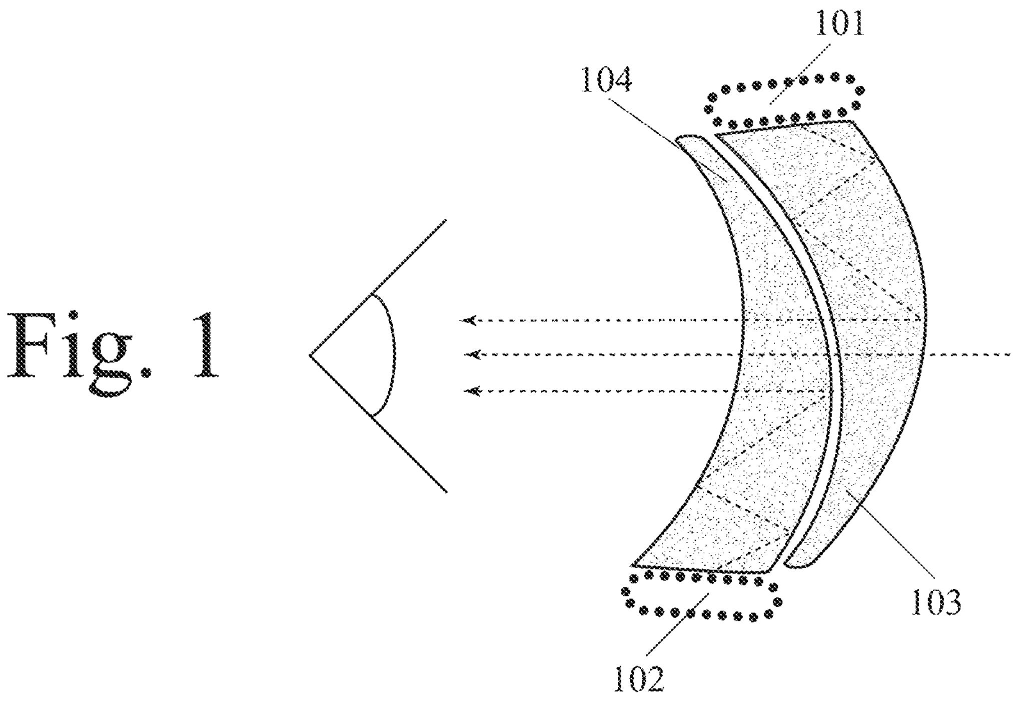
FIG. 1 shows an optical structure for each eye in augmented reality eyewear including two image displays and two overlapping waveguides.

Before discussing the specific embodiments of this invention which are shown in FIGS. 1 through 6, this disclosure provides an introductory section which covers some of the general concepts, components, and methods which comprise this invention. Where relevant, these concepts, components, and methods can be applied as variations to the examples shown in FIGS. 1 through 6 which are discussed afterwards.

In an example, an optical structure for each eye of augmented reality eyewear can comprise: a first image display on a first side of a person's eye; a second image display on a second side of the eye which is opposite the first side of the eye, wherein light rays from the first image display and light rays from the second image display show one or more virtual objects in the person's field of view; a first waveguide which reflects light rays from the first image display multiple times before those light rays are directed toward the eye; and a second waveguide which reflects light rays from the second image display multiple times before those light rays are directed toward the eye; wherein light rays from the environment pass through the first waveguide and/or the second waveguide to reach the eye.

In an example, a first side can be above (a space in front of) the eye and the second side can be below (the space in front of) the eye. In an example, a first side can be to the right of (a space in front of) the eye and the second side can be to the left of (the space in front of) the eye. In an example, the first waveguide and the second waveguide can at least partially overlap. In an example, the first waveguide and the second waveguide may not overlap. In an example, the waveguide can be tapered. In an example, light beams from a first image display and light beams from a second image display can combine to show one or more virtual objects and/or scenes in a person's field of view. In an example, light beams from a first image display and light beams from a second image display can show different virtual objects and/or scenes in a person's field of view.

In an example, an optical structure for each eye of augmented reality eyewear can comprise: a distal virtual image display; a proximal virtual image display; a distal internal-reflection waveguide; and a proximal internal-reflection waveguide; wherein light rays comprising a given pixel of an image from the distal virtual image display are reflected multiple times inside the distal internal-reflection waveguide before these light rays exit the distal internal-reflection waveguide; wherein light rays comprising a given pixel of an image from the proximal virtual image display are reflected multiple times inside the proximal internal-reflection waveguide before these light rays exit the proximal internal-reflection waveguide; wherein light rays from the distal virtual image display and the proximal virtual image display create images of virtual objects in the person's field of view; and wherein light rays from the environment pass through the distal internal-reflection waveguide and/or the proximal internal-reflection waveguide to reach a person's eye.

In an example, a distal image display can be above (a space in front of) the eye and a proximal image display can be below (the space in front of) the eye, or vice versa. In an example, a distal image display can be to the right of (a space in front of) the eye and a proximal image display can be to the left of (the space in front of) the eye, or vice versa. In an example, a distal waveguide and a proximal waveguide can at least partially overlap. In an example, a distal waveguide and a proximal waveguide may not overlap. In an example, a waveguide can be tapered. In an example, light beams from a distal image display and light beams from a proximal image display can combine to show one or more virtual objects and/or scenes in a person's field of view. In an example, light beams from a distal image display and light beams from a proximal image display can show different virtual objects and/or scenes in a person's field of view.

In an example, an optical structure for each eye of augmented reality eyewear can comprise: a first image display on a first side of a person's eye; a second image display on a second side of the eye which is opposite the first side of the eye, wherein light rays from the first image display and light rays from the second image display show one or more virtual objects in the person's field of view; an arcuate distal reflector; a first waveguide which reflects light rays from the first image display multiple times before those light rays are directed toward the arcuate distal reflector, wherein the arcuate distal reflector at least partially reflects light rays from the first image display toward the eye; and a second waveguide which reflects light rays from the second image display multiple times before those light rays are directed toward the arcuate distal reflector, wherein the arcuate distal reflector at least partially reflects light rays from the first image display toward the eye. In an example, a first side can be above (a space in front of) an eye and a second side can be below (the space in front of) the eye. In an example, a first side can be to the right of (a space in front of) an eye and a second side can be to the left of (the space in front of) the eye. In an example, a waveguide can be tapered.

In an example, an optical structure for each eye of augmented reality eyewear can comprise: a first image display (e.g. image source) on a first side of a person's eye (e.g. above or to the right of a space directly in front of the eye); a second image display (e.g. image source) on a second side of the eye (e.g. below or to the left of the space directly in front of the eye) which is opposite the first side of the eye, wherein light rays from the first image display and light rays from the second image display show one or more virtual objects in the person's field of view; a distal arcuate light reflector (e.g. concave partially-reflecting mirror); a first reflecting prism which reflects light rays from the first image display toward the distal arcuate light reflector, wherein the arcuate distal reflector at least partially reflects light rays from the first image display toward the person's eye; and a second reflecting prism which reflects light rays from the second image toward the distal arcuate light reflector, wherein the arcuate distal reflector at least partially reflects light rays from the second image display toward the person's eye.

It is to be understood that the term "side" (e.g. in the expression "on one side of an eye") can include a right side, a left side, an upper side, or a lower side. It is to be understood that the phrases ("to the right of an eye" and "on the right side of an eye") mean being to the right of a space directly in front of (e.g. within three inches of) an eye (e.g. on the right portion of a rim of eyewear), not being implanted in a person's skull or physically attached to an eyeball! It is to be understood that the phrases ("to the left of an eye" and "on the left side of an eye") mean being to the left of a space directly in front of (e.g. within three inches of) an eye (e.g. on the left portion of a rim of eyewear), not being implanted in a person's skull or physically attached to an eyeball! It is to be understood that the phrase ("above of an eye") means being above a space directly in front of (e.g. within three inches of) an eye (e.g. on the upper portion of a rim of eyewear), not being implanted in a person's skull or physically attached to an eyeball! It is to be understood that the phrase ("below an eye" and "under an eye") means being below a space directly in front of (e.g. within three inches of) an eye (e.g. on the lower portion of a rim of eyewear), not being implanted in a person's skull or physically attached to an eyeball!.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein the first area is in the upper half of the field of view from an eye and the second area is in the lower half of the field of view from the eye.

In another example, an optical structure for each eye in augmented reality eyewear can comprise: a distal arcuate reflector (e.g. transflective mirror); a first image display; a first series of reflective surfaces, wherein light rays from the first image display are reflected multiple times in an alternating distal-then-proximal directions by the first series of reflective surfaces before they are directed toward the distal arcuate reflector; a second image display; a second series of reflective surfaces, wherein light rays from the second image display are reflected multiple times in an alternating distal-then-proximal directions by the second series of reflective surfaces before they are directed toward the distal arcuate reflector; and wherein light rays from the first image display and from the second image display are reflected by the distal arcuate reflector toward an eye.

In an example, an optical structure for each eye in augmented reality eyewear can comprise: a distal arcuate reflector (e.g. transflective mirror); a first image display to the right of a space directly in front of an eye; a first series of reflective surfaces, wherein light rays from the first image display are reflected multiple times by the first series of reflective surfaces before they are directed toward the distal arcuate reflector; a second image display to the left of the space directly in front of the eye; a second series of reflective surfaces, wherein light rays from the second image display are reflected multiple times by the second series of reflective surfaces before they are directed toward the distal arcuate reflector; and wherein light rays from the first image display and from the second image display are reflected by the distal arcuate reflector toward an eye.

In an example, an optical structure for each eye of augmented reality eyewear can comprise: a first virtual image display (e.g. first image display and/or image source); a second virtual image display (e.g. second image display and/or image source); a first internal-reflection waveguide (e.g. first waveguide and/or internal reflection prism); and a second internal-reflection waveguide (e.g. second waveguide and/or internal reflection prism); wherein light rays comprising a given pixel of an image from the first virtual image display are reflected multiple times inside the first internal-reflection waveguide before these light rays exit the first internal-reflection waveguide to reach the person's eye; wherein light rays comprising a given pixel of an image from the second virtual image display are reflected multiple times inside the second internal-reflection waveguide before these light rays exit the second internal-reflection waveguide in order to reach the person's eye; wherein light rays from the first virtual image display and the second virtual image display create images of virtual objects in the person's field of view.

In an example, an optical structure for each eye of augmented reality eyewear can comprise: a first image display (e.g. image source) on a first side of a person's eye (e.g. above or to the right of a space directly in front of the eye); a second image display (e.g. image source) on a second side of the eye (e.g. below or to the left of the space directly in front of the eye) which is opposite the first side of the eye, wherein light rays from the first image display and light rays from the second image display show one or more virtual objects in the person's field of view; an arcuate distal reflector; a first waveguide (e.g. internal reflection prism) which reflects light rays from the first image display multiple times before those light rays are directed toward the arcuate distal reflector, wherein the arcuate distal reflector at least partially reflects light rays from the first image display toward the eye; and a second waveguide (e.g. internal reflection prism) which reflects light rays from the second image display multiple times before those light rays are directed toward the arcuate distal reflector; wherein the arcuate distal reflector at least partially reflects light rays from the first image display toward the eye.

In another example, augmented reality eyewear can comprise two optical structures, one for each eye, wherein each optical structure comprises two image displays (e.g. light-emitting arrays or image sources) and two waveguides (e.g. internal reflection prisms), wherein the two waveguides internally reflect light rays from the two image displays (respectively) multiple times before the light rays are directed toward the eye, and wherein a first image display is located above (a space directly in front of) an eye and a second image display is located below (the space directly in front of) the eye.

In an example, augmented reality eyewear can comprise two optical structures, one for each eye, wherein each optical structure comprises two image displays (e.g. light-emitting arrays or image sources) and two waveguides (e.g. internal reflection prisms), wherein the two waveguides internally reflect light rays from the two image displays (respectively) multiple times before the light rays are directed toward the eye, and wherein a first image display is located on the rim of (a right or left) half of the eyewear (e.g. on or near the nose bridge) and a second image display is located on a sidepiece the half of the eyewear.

In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein the two waveguides internally reflect light rays from the two image displays (respectively) multiple times before the light rays are directed toward the distal arcuate reflector, where the distal arcuate reflector (partially) reflects these light rays toward the eye, and wherein a first image display is located on the upper rim of (a right or left) half of the eyewear and a second image display is located on the lower rim of the half of the eyewear.

In an example, a cross-sectional view of an optical structure for an eye of augmented reality eyewear can comprise: a distal arcuate reflector (e.g. concave transflective mirror); and a plurality of optical modules; wherein each optical module further comprises an image display, a waveguide (e.g. internal reflection prism), and a proximal reflector; and wherein light rays from an image display are internally-reflected multiple times by a waveguide before being redirected by a proximal reflector toward the distal arcuate reflector. In another example, a waveguide and a proximal reflector in a given optical module and/or on a given side of a space in front of an eye can be contiguous to each other. In an example, an optical structure for each eye in augmented reality eyewear can comprise: a distal arcuate reflector (e.g. concave transflective mirror); four image displays at different locations (e.g. right, upper, left, and lower) on the circumference of a space directly in front of an eye; and four waveguides, wherein the four waveguides internally reflect light rays from the four image displays, respectively, multiple times before directing these light rays toward the distal arcuate reflector; and wherein the distal arcuate reflector partially reflects these light rays toward an eye and partially transmits light rays from the environment toward the eye. In an example, an optical structure for each eye in augmented reality eyewear can comprise: four image displays at different locations (e.g. right, upper, left, and lower) on the circumference of a space directly in front of an eye; and four waveguides, wherein the four waveguides internally reflect light rays from the four image displays, respectively, multiple times before directing the light rays toward the eye.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein a third area is defined as the area where the first area and the second area overlap, wherein a fourth area is defined as the sum of the first area and the second area, and wherein the size of third area is between 25% and 60% of the size of the fourth area. In an example, an optical structure for each eye of augmented reality eyewear can comprise an array of six image displays distributed around the circumference of a field of view of an eye. In another example, an optical structure for each eye of augmented reality eyewear can comprise an array of four image displays distributed around the circumference of a field of view of an eye.

In an example, augmented reality eyewear can comprise two optical structures, one for each eye, wherein each optical structure comprises two image displays (e.g. light-emitting arrays or image sources) and two waveguides (e.g. internal reflection prisms), wherein a first image display is located on the upper rim of (a right or left) half of the eyewear and a second image display is located on the lower rim of the half of the eyewear. In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms). In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein a first image display is located to the right of (a space directly in front of) an eye and a second image display is located to the left of (the space directly in front of) the eye.

In an example, augmented reality eyewear can comprise two optical structures, one for each eye, wherein each optical structure comprises: a first image display; a second image display; a first proximal reflector; a second proximal reflector; and a distal arcuate reflector (e.g. transflective mirror), wherein light rays from the first image display are reflected by the first proximal reflector toward a first portion (e.g. first half) of the distal arcuate reflector, wherein light rays from the second image display are reflected by the second proximal reflector toward a second portion (e.g. second half) of the distal arcuate reflector, and wherein light rays from the first image display and the second image display are (partially) reflected by the distal arcuate reflector toward the eye.

In another example, augmented reality eyewear can comprise two optical structures, one for each eye, wherein each optical structure comprises: a upper (e.g. above a space in front of the eye) image display; a lower (e.g. below a space in front of the eye) image display; a upper proximal reflector; a lower proximal reflector; and a distal arcuate reflector (e.g. transflective mirror), wherein light rays from the upper image display are reflected by the upper proximal reflector toward the distal arcuate reflector, wherein light rays from the lower image display are reflected by the lower proximal reflector toward the distal arcuate reflector, and wherein light rays from the upper image display and the lower image display are (partially) reflected by the distal arcuate reflector toward the eye. In an example, the first side can be to the right of (a space in front of) an eye and the second side can be to the left of (the space in front of) the eye. In another example, a single-eye portion of augmented reality eyewear can comprise a plurality of image displays.

In an example, a distal virtual image display can be below (a space in front of) a person's eye and a proximal virtual image display can be above (the space in front of) a person's eye. In an example, a first image display can be to the right of (e.g. on the right side of) a space directly in front of an eye and a second image display can be to the left of (e.g. on the left side of) the left side of a space directly in front of an eye. In an example, a first image display can be above (e.g. on the upper side of) a space directly in front of an eye and a second image display can be below (e.g. on the lower side of) a space directly in front of an eye.

In an example, an optical structure for augmented reality can comprise a first light emitter (e.g. image display) which is to the right of (a space in front of) an eye and a second light emitter (e.g. image display) which is located to the left (the space in front of) of the eye. In an example, an optical structure for each eye of augmented reality eyewear can comprise: a first (right-side) image display to the right of center (e.g. to the right of the center of the optical structure) and a second (left-side) image display to the left of center (e.g. to the left of the center of the optical structure).

In another example, a cross-sectional view of an optical structure for an eye of augmented reality eyewear can comprise: a distal arcuate reflector (e.g. concave transflective mirror); and a annular array (e.g. ring) of optical modules; wherein each optical module further comprises an image display and a proximal reflector; and wherein light rays from an image display redirected by a proximal reflector toward the distal arcuate reflector. In an example, an optical structure for each eye of augmented reality eyewear can comprise comprises an array of image displays distributed around the circumference of a near-eye area.

In another example, an optical structure for each eye of augmented reality eyewear can also include a ring of reflectors. In an example, an optical structure for each eye of augmented reality eyewear can also include an annular array of reflectors. In an example, an optical structure for each eye of augmented reality eyewear can comprise: an annular array of image displays (e.g. image sources and/or light emitters) around the circumference of a field of view for an eye; and a distal arcuate reflector (e.g. transflective mirror), wherein light rays from the annular array of image displays are directed toward the distal arcuate reflector and the distal arcuate reflector reflects these light rays toward the eye. In an example, a waveguide can be a polygonal prism. In an example, a waveguide can be an internal reflection prism. In an example, a first (e.g. upper or right side) waveguide and a second (e.g. lower or left side) waveguide can meet together in the center of the field of view for an eye. In another example, there can be a gap between a first (e.g. upper or right side) waveguide and a second (e.g. lower or left side) waveguide in the center of the field of view for an eye, wherein this gap is between 5 and 20 mm.

In an example, a waveguide (e.g. internally-reflective polygonal prism) can have a rhombus cross-sectional shape. In another example, a waveguide can be a polygonal prism with a triangular cross-sectional shape. In an example, a waveguide can be tapered. In an example, a waveguide can have a parallelogram longitudinal shape. In an example, a waveguide can have a quadrilateral cross-sectional shape. In an example, a waveguide can have a quadrilateral shape. In an example, a waveguide can have a rhomboid shape. In another example, a waveguide can have a trapezoidal shape. In an example, a waveguide can have a wedge shape.

In another example, an optical structure for each eye of augmented reality eyewear can comprise: an image display; a waveguide (e.g. internal reflection prism with a triangular or quadrilateral cross-sectional shape); a proximal reflector (e.g. with a triangular or quadrilateral cross-sectional shape); and a distal arcuate reflector (e.g. concave transflective mirror), wherein light rays from the image display are internally reflected multiple times within the waveguide before being reflected by the proximal reflector toward the distal arcuate reflector, and wherein light rays from the distal arcuate reflector are reflected proximally toward an eye.

In an example, an optical structure for each eye of augmented reality eyewear can comprise: a distal arcuate reflector (e.g. transflective mirror) and two optical modules on opposite sides of an eye (e.g. above and below, respectively, a space in front of the eye; or to the right and to the left, respectively, of a space in front of the eye); wherein each optical module further comprises an image display, a waveguide (e.g. internal reflection prism with a triangular or quadrilateral cross-sectional shape), and a proximal reflector (e.g. with a triangular or quadrilateral cross-sectional shape); wherein light rays from an image display are internally reflected multiple times within the waveguide before being reflected by a proximal reflector toward the distal arcuate reflector, and wherein light rays from the distal arcuate reflector are reflected toward an eye.

In an example, an optical structure for each eye of augmented reality eyewear can comprise: a distal arcuate reflector (e.g. transflective mirror) and two optical modules on opposite sides of a space in front of an eye (e.g. above and below the space, respectively; or to the right and to the left of the space, respectively); wherein each optical module further comprises an image display, a waveguide (e.g. an internal reflection prism with a parallelogram cross-sectional shape), and a proximal reflector (e.g. with a triangular cross-sectional shape); wherein light rays from an image display are internally reflected multiple times within a waveguide before being reflected by a proximal reflector toward the distal arcuate reflector, and wherein light rays from the distal arcuate reflector are reflected proximally toward an eye. In an example, the waveguides can be polygonal prisms (e.g. with triangular or quadrilateral cross-sectional shapes).

In an example, a first waveguide (e.g. internal reflection prism) and a second waveguide (e.g. internal reflection prism) can at least partially overlap. In an example, augmented reality eyewear can comprise two optical structures, one for each eye, wherein each optical structure comprises two image displays (e.g. light-emitting arrays or image sources) and two waveguides (e.g. internal reflection prisms), wherein between 5% and 25% of the two waveguides overlap (from distal-to-proximal perspective) in a central portion of the optical structure. In another example, first and second waveguides do not overlap from a frontal perspective, wherein there is a central gap, hole, opening, and/or aperture between them.

In an example, a first reflection of light rays from an image display within a waveguide can be an internal reflection from a proximal wall, edge, or surface of the waveguide. In another example, a waveguide can have total internal reflection, wherein total internal reflection means that light rays are generally contained within the waveguide by internal reflection, but can still escape from within the waveguide at when they reach an exterior wall of the waveguide at (or above) a selected incidence angle. In an example, light rays from the (first and second) image displays can be internally reflected (e.g. multiple times) by the walls of the (first and second, respectively) proximal reflectors. In an example, reflection of light rays from an image display within a waveguide can comprise a proximal-distal-proximal sequence of internal reflections within the waveguide, wherein a proximal internal reflection is an internal reflection from a proximal wall, edge, or surface of the waveguide and a distal internal reflection is an internal reflection from a distal wall, edge, or surface of the waveguide. In an example, the proximal surface, edge, and/or wall of a waveguide can have a shape selected from the group consisting of: spheroid; conic section; proximally-concave; and angled straight line.

In an example, a waveguide can comprise: a first section which is closer to the image display, wherein the first section has a first reflectivity level; and a second section which is farther from the image display, wherein the second section has a second reflectivity level, wherein the second reflectivity level is less than the first reflectivity level. In an example, a waveguide can comprise: a first section which is closer to the image display, wherein the first section has a first refractive index; and a second section which is farther from the image display, wherein the second section has a second refractive index, wherein the second refractive index is greater than the first refractive index.

In another example, a distal arcuate reflector can comprise a spherical transflective mirror. In an example, a distal arcuate reflector can have a shape which is a section of a sphere or ellipsoid. In another example, a distal arcuate reflector can be proximally-concave (e.g. opening in a proximal direction) transflective mirror. In an example, a distal arcuate reflector can reflect light rays from image displays toward an eye in a converging manner. In an example, a distal arcuate reflector can be a proximally-concave transflective mirror, wherein proximally-concave means that the curve opens in a proximal direction (e.g. toward the eye), and wherein transflective means partially transmitting light and partially reflecting light. In an example, a distal arcuate reflector can transmit between 20% and 50% of incident light coming from the environment to the eye.

In an example, an optical structure for each eye in augmented reality eyewear can comprise: two (e.g. right-side and left-side) image displays which emit light rays toward the center of the field of view for an eye; two proximal waveguides (e.g. internal reflection prisms) which internally reflect these light rays multiple times before reflecting them away from the eye toward a distal arcuate reflector (e.g. transflective mirror); and the distal arcuate reflector which partially reflects these light rays toward the eye and partially transmits light rays from the environment to reach the eye. In an example, an optical structure for each eye in augmented reality eyewear can comprise: two (e.g. upper and lower) image displays which emit light rays toward the center of the field of view for an eye; two proximal reflectors (e.g. mirrors and/or reflective prisms) which reflect these light rays away from the eye toward a distal arcuate reflector (e.g. transflective mirror); and the distal arcuate reflector which partially reflects these light rays toward the eye and partially transmits light rays from the environment to reach the eye.

In another example, an optical structure for each eye of augmented realty eyewear can comprise: a distal virtual image display; a proximal virtual image display; a distal internal-reflection waveguide; and a proximal internal-reflection waveguide; wherein light rays comprising a given pixel of an image from the distal virtual image display are reflected multiple times inside the distal internal-reflection waveguide before these light rays exit the distal internal-reflection waveguide; wherein light rays comprising a given pixel of an image from the proximal virtual image display are reflected multiple times inside the proximal internal-reflection waveguide before these light rays exit the proximal internal-reflection waveguide; wherein light rays from the distal virtual image display and the proximal virtual image display create images of virtual objects in the person's field of view; and wherein light rays from the environment pass through the distal internal-reflection waveguide and/or the proximal internal-reflection waveguide to reach a person's eye.

In an example, an optical structure for each eye of augmented reality eyewear can comprise: a first image display (e.g. image source) on a first side of a person's eye (e.g. above or to the right of a space directly in front of the eye); a second image display (e.g. image source) on a second side of the eye (e.g. below or to the left of the space directly in front of the eye) which is opposite the first side of the eye, wherein light rays from the first image display and light rays from the second image display show one or more virtual objects in the person's field of view; a first waveguide (e.g. internal reflection prism) which internally reflects light rays from the first image display multiple times before those light rays are directed toward the eye; and a second waveguide (e.g. internal reflection prism) which internally reflects light rays from the second image display multiple times before those light rays are directed toward the eye, wherein light rays from the environment pass through the first waveguide and/or the second waveguide to reach the person's eye.

In another example, between 50% and 80% of light beams from the environment to a person's eye which pass through a first waveguide can also pass through a second waveguide. In an example, first and second waveguides do not overlap from a frontal perspective, wherein substantially no light beams from the environment to a person's eye which pass through a first waveguide also pass through a second waveguide.

In an example, a first image display can project light rays in a first direction and a second image display can project light rays in a second direction, wherein these directions are both toward the center of a field of view for an eye, wherein the first direction is from above of the eye toward the center of the field of view, and the second direction is from below the eye toward the center of the field of view. In an example, light rays from a left-side virtual image display can enter the left side of a first waveguide and light rays from a right-side virtual image display can enter the right side of a second waveguide.

In an example, an optical structure for each eye of augmented reality eyewear can include a right-side set of components (comprising a right-side image display and a right-side waveguide) and a left-side set of components (comprising a left-side image display and a left-side waveguide), wherein the right-side set and the left-side set are symmetric to each other with respect to reflection across a central vertical plane through the optical structure. In another example, an optical structure for each eye of augmented reality eyewear can include an upper set of components (comprising an upper image display and an upper waveguide) and a lower set of components (comprising a lower image display and a lower waveguide), wherein the upper set and the lower set are asymmetric to each other with respect to reflection across a central horizontal plane through the optical structure.

In an example, a first image display and a second image display can be equal distances from the center of an optical structure in front of an eye. In another example, a first image display can project a first virtual object at a first apparent distance from a person and a second image display can project a second virtual object at a second apparent distance from the person. In an example, a waveguide can have an arcuate and tapered shape, becoming narrower with increasing distance from an image display. In an example, the centroid of a first waveguide and the centroid of a second waveguide can both be the same distance from an eye.

In an example, a first image display and a second image display can be coplanar. In an example, a first plane is a virtual plane which best fits the image-generating side (e.g. surface) of an image display and a second plane is a virtual plane which best fits longitudinal axes of a waveguide, wherein the first and second planes intersect at an angle in the range of 20 to 40 degrees. In an example, a proximal edge, wall, or side of a waveguide can comprises a single plane and a distal edge, wall or side of a waveguide can comprise two planes which form an acute angle as they connect to each other. In another example, a proximal edge, wall, or side of a waveguide can comprise a single plane.

In an example, a waveguide can comprise two sections made from different materials, wherein a first plane is the virtual plane which best fits the interface between the two sections, wherein a second plane is the virtual plane which is substantially orthogonal to a vector which extends straight forward from the center of the eye, and wherein the first plane intersects the second plane at an angle between 25 and 55 degrees. In another example, a waveguide can comprise two sections made from different materials, wherein a virtual plane best fits the interface between the two sections, wherein the virtual plane intersects the longitudinal axis of the waveguide at an angle between 15 and 35 degrees. In an example, a waveguide can comprise two sections with different refractive indexes, wherein a virtual plane best fits the interface between the two sections, wherein the virtual plane intersects the longitudinal axis of the waveguide at an angle between 25 and 55 degrees.

In another example, a waveguide can comprise two sections with different refractive indexes, wherein a first plane is the virtual plane which best fits the interface between the two sections, wherein a second plane is the virtual plane which is substantially orthogonal to a vector which extends straight forward from the center of the eye, and wherein the first plane intersects the second plane at an angle between 25 and 55 degrees. In an example, an optical structure for each eye of augmented reality eyewear can comprise an array of coplanar image displays distributed around the circumference of a field of view of an eye, wherein light rays from the displays are combined to form one or more virtual images in the field of view.

In an example, light rays from a first image display are projected into a central area of the field of view of an eye and light rays from a second image display are projected into a peripheral area of the field of view of the eye. In an example, light rays from an upper image display can create a first portion (e.g. the upper half) of a virtual image and light rays from a lower image display can create a second portion (e.g. the lower half) of a virtual image.

In an example, a portion of first light rays from a first image display (e.g. image source) and a portion of second light rays from a second image display (e.g. image source) can overlap and/or combine on a distal arcuate reflector (e.g. transflective mirror). In an example, an optical structure for each eye of augmented reality eyewear can comprise an array of image displays distributed around the circumference of a field of view of an eye, wherein light rays from the displays are combined to form one or more virtual images in the field of view. In another example, images from first and a second image displays can overlap on a central portion of a distal arcuate reflector (e.g. transflective mirror), wherein between 20% and 40% of images from the first and second images displays overlap on the distal arcuate reflector. In an example, light rays from a first image display and a second image display can overlap when they reach a distal arcuate reflector (e.g. transflective mirror). In another example, light rays from the first image display and the second image display can combine (e.g. piece together or overlap) to display one or more virtual objects in the field of view of the eye.

In an example, images from first and a second image displays can overlap on a central portion of a distal arcuate reflector (e.g. transflective mirror), wherein between 5% and 25% of images from the first and second images displays overlap on the distal arcuate reflector, wherein (portions of) images in the central overlapping area have greater resolution, greater brightness, and/or greater opacity than (portions of) images in peripheral non-overlapping areas. In an example, light beams from a first image display and a second image display can combine to show one or more virtual images, scenes, and/or objects in a person's field of view, wherein the combination of light rays from the two image displays creates an image, scene, and/or object with greater brightness, resolution, and/or opacity than an image, scene, and/or object created from light rays from just one image display.

In an example, a first image display can project light rays which are redirected by a first portion of a convex lens towards a person's eye and a second image display can project light rays which are redirected by a second portion of the convex lens towards the person's eye. In an example, an optical structure for each eye in augmented reality eyewear can also include a microlens array. In an example, an optical structure for each eye of augmented reality eyewear can further comprise two Fresnel lenses which are located between a distal arcuate reflector (e.g. transflective mirror) and the eye. In an example, an optical structure for each eye of augmented reality eyewear can comprise the following proximal-to-distal sequence of optical components: a lens; a first waveguide (e.g. internal reflection prism) and a second waveguide (e.g. internal reflection prism); a first image display and a second image display; and a distal arcuate reflector (e.g. transflective mirror); wherein proximal means closer to an eye and distal means farther from the eye.

In another example, an optical structure for each eye of augmented reality eyewear can comprise the following proximal-to-distal sequence of optical components: a lens; a first image display and a second image display; a first reflector and a second reflector; and a distal arcuate reflector (e.g. transflective mirror); wherein proximal means closer to an eye and distal means farther from the eye. In an example, an optical structure for each eye of augmented reality eyewear can further comprise a lens. In another example, an optical structure for each eye of augmented reality eyewear can further comprise a first Fresnel lens which is located between a first image display and a first waveguide and a second Fresnel lens which is between a second image display and a second waveguide.

In an example, an optical structure for each eye of augmented reality eyewear can further comprise a lens which is located between a distal arcuate reflector (e.g. transflective mirror) and the eye. In an example, an optical structure for each eye of augmented reality eyewear can further comprise a lens between a waveguide and an eye. In an example, light rays from a first image display are directed onto a first area of a front lens or reflector and light rays from a second image display are directed onto a second area of the front lens or reflector.

In an example, an optical structure for each eye of augmented reality eyewear can further comprise an actuator which changes the distance between a waveguide (e.g. internal reflection prism) and a lens to change the focal plane and/or focal distance of virtual objects in a person's field of view. In an example, an optical structure for each eye of augmented reality eyewear can further comprise an actuator which changes (e.g. adjusts) the distance between a waveguide (e.g. internal reflection prism) and a distal arcuate reflector (e.g. transflective mirror) based on eye movement to change the focal plane and/or distance at which virtual objects are observed. In an example, an optical structure for each eye of augmented reality eyewear can further comprise an actuator which changes the distance between a proximal reflector and a lens.

In another example, an optical structure for each eye of augmented reality eyewear can further comprise an actuator which changes (e.g. adjusts) the distance between a light emitter and a waveguide. In an example, an optical structure for each eye of augmented reality eyewear can further comprise an actuator which changes (e.g. adjusts) the distance between a light emitter and a proximal reflector. In another example, an optical structure for each eye of augmented reality eyewear can further comprise an actuator which changes the distance between a light emitter and a lens. In an example, an optical structure for each eye of augmented reality eyewear can further comprise an actuator which changes the distance between a distal arcuate reflector (e.g. transflective mirror) and a lens to change the focal plane and/or focal distance of virtual objects in a person's field of view.

In an example, an optical structure for each eye of augmented reality eyewear can further comprise an actuator which rotates, tilts, and/or pivots a waveguide (e.g. internal reflection prism) to change the focal plane and/or distance at which virtual objects are observed. In an example, an optical structure for each eye of augmented reality eyewear can further comprise an actuator which rotates, tilts, and/or pivots a proximal reflector based on eye movement to change the focal plane and/or distance at which virtual objects are observed. In an example, an optical structure for each eye of augmented reality eyewear can further comprise an actuator which rotates, tilts, and/or pivots a distal arcuate reflector (e.g. transflective mirror) to change the focal plane and/or distance at which virtual objects are observed.

In another example, an optical structure for each eye of augmented reality eyewear can further comprise an actuator which rotates, tilts, and/or pivots a proximal reflector. In an example, an optical structure for each eye of augmented reality eyewear can include: a distal arcuate reflector (e.g. concave transflective mirror); a first image display; a first proximal reflector, wherein light rays from the first image display are redirected by the first proximal reflector toward the distal arcuate reflector; a second image display; a second proximal reflector, wherein light rays from the second image display are redirected by the second proximal reflector toward the distal arcuate reflector; and an actuator which changes the angle between the first proximal reflector and the distal arcuate reflector and/or the angle between the second proximal reflector and the distal arcuate reflector.

In another example, an optical structure for each eye of augmented reality eyewear can comprise a metamaterial waveguide. In an example, an optical structure for each eye in augmented reality eyewear can also include an array of movable (e.g. rotatable and/or tiltable) micromirrors. In another example, an optical structure for each eye of augmented reality eyewear can further comprise a holographic optical element.

In an example, an optical structure for each eye of augmented reality eyewear can comprise: a partially-reflective arcuate reflector which is configured to be in front of a person's eye; a right-side virtual image display, wherein the right-side virtual image display emits first light rays toward the arcuate reflector, and wherein the first light rays are reflected by a right half of the arcuate reflector toward the person's eye; and a left-side virtual image display, wherein the left-side virtual image display emits second light rays toward the arcuate reflector, and wherein the second light rays are reflected by a left half of the arcuate reflector toward the person's eye.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein the first area is on right half of the field of view from an eye and the second area is on the left half of the field of view from the eye.

In an example, an optical structure for each eye in augmented reality eyewear can comprise: a distal arcuate reflector (e.g. transflective mirror); a first image display; a first series of reflective surfaces, wherein light rays from the first image display are reflected multiple times by the first series of reflective surfaces before they are directed toward the distal arcuate reflector; a second image display; a second series of reflective surfaces, wherein light rays from the second image display are reflected multiple times by the second series of reflective surfaces before they are directed toward the distal arcuate reflector; and wherein light rays from the first image display and from the second image display are reflected by the distal arcuate reflector toward an eye. In an example, an optical structure for each eye in augmented reality eyewear can comprise: two image displays at different locations on the circumference of a space directly in front of an eye; and two waveguides, wherein the two waveguides internally reflect light rays from the two image displays, respectively, multiple times before directing the light rays toward the eye.

In an example, an optical structure for each eye of augmented reality eyewear can comprise: a first image display (e.g. image source) on a first side of a person's eye (e.g. above or to the right of a space directly in front of the eye); a second image display (e.g. image source) on a second side of the eye (e.g. below or to the left of the space directly in front of the eye) which is opposite the first side of the eye, wherein light rays from the first image display and light rays from the second image display show one or more virtual objects in the person's field of view; a first waveguide (e.g. internal reflection prism) which internally reflects light rays from the first image display multiple times before those light rays are directed toward the eye; and a second waveguide (e.g. internal reflection prism) which internally reflects light rays from the second image display multiple times before those light rays are directed toward the eye.

In an example, an optical structure for each eye of augmented reality eyewear can comprise: a first image display on a first side of a person's eye; a second image display on a second side of the eye which is opposite the first side of the eye, wherein light rays from the first image display and light rays from the second image display show one or more virtual objects in the person's field of view; an arcuate distal reflector; a first waveguide which reflects light rays from the first image display multiple times before those light rays are directed toward the arcuate distal reflector, wherein the arcuate distal reflector at least partially reflects light rays from the first image display toward the eye; and a second waveguide which reflects light rays from the second image display multiple times before those light rays are directed toward the arcuate distal reflector, wherein the arcuate distal reflector at least partially reflects light rays from the first image display toward the eye.

In another example, augmented reality eyewear can comprise two optical structures, one for each eye, wherein each optical structure comprises two image displays (e.g. light-emitting arrays or image sources) and two waveguides (e.g. internal reflection prisms), wherein the two waveguides internally reflect light rays from the two image displays (respectively) multiple times before the light rays are directed toward the eye, and wherein a first image display is located on the upper rim of (a right or left) half of the eyewear and a second image display is located on the lower rim of the half of the eyewear. In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), and wherein the two waveguides internally reflect light rays from the two image displays (respectively) multiple times before the light rays are directed toward the distal arcuate reflector, where the distal arcuate reflector (partially) reflects these light rays toward the eye.

In another example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein the two waveguides internally reflect light rays from the two image displays (respectively) multiple times before the light rays are directed toward the distal arcuate reflector, where the distal arcuate reflector (partially) reflects these light rays toward the eye, and wherein a first image display is located to the right of (a space directly in front of) an eye and a second image display is located to the left of (the space directly in front of) the eye.

In an example, a cross-sectional view of an optical structure for an eye of augmented reality eyewear can comprise: a distal arcuate reflector (e.g. concave transflective mirror); and a plurality of optical modules; wherein each optical module further comprises an image display and a proximal reflector; and wherein light rays from an image display redirected by a proximal reflector toward the distal arcuate reflector. In an example, an optical structure for each eye in augmented reality eyewear can comprise: a distal arcuate reflector (e.g. concave transflective mirror); six image displays at different locations on the circumference of a space directly in front of an eye; and six waveguides, wherein the six waveguides internally reflect light rays from the six image displays, respectively, multiple times before directing these light rays toward the distal arcuate reflector; and wherein the distal arcuate reflector partially reflects these light rays toward an eye and partially transmits light rays from the environment toward the eye.

In an example, an optical structure for each eye in augmented reality eyewear can comprise: six image displays at different locations on the circumference of a space directly in front of an eye; and six waveguides, wherein the six waveguides internally reflect light rays from the six image displays, respectively, multiple times before directing the light rays toward the eye. In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein a third area is defined as the area where the first area and the second area overlap, wherein a fourth area is defined as the sum of the first area and the second area, and wherein the size of third area is between 5% and 20% of the size of the fourth area.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein a third area is defined as the area where the first area and the second area overlap, wherein a fourth area is defined as the sum of the first area and the second area, and wherein the size of third area is between 50% and 80% of the size of the fourth area.

In an example, an optical structure for each eye of augmented reality eyewear can comprise: a distal arcuate reflector (e.g. transflective mirror) and two optical modules on opposite sides of an eye (e.g. above and below, respectively, a space in front of the eye; or to the right and to the left, respectively, of a space in front of the eye); wherein each optical module further comprises an image display and a proximal reflector; wherein light rays from an image display are reflected by a proximal reflector toward the distal arcuate reflector, and wherein light rays from the distal arcuate reflector are reflected toward an eye.

In another example, augmented reality eyewear can comprise two optical structures, one for each eye, wherein each optical structure comprises two image displays (e.g. light-emitting arrays or image sources) and two waveguides (e.g. internal reflection prisms). In an example, augmented reality eyewear can comprise two optical structures, one for each eye, wherein each optical structure comprises two image displays (e.g. light-emitting arrays or image sources) and two waveguides (e.g. internal reflection prisms), wherein a first image display is located to the right of (a space directly in front of) an eye and a second image display is located to the left of (the space directly in front of) the eye.

In another example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein a first image display is located above (a space directly in front of) an eye and a second image display is located below (the space directly in front of) the eye. In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein a first image display is located on the rim of (a right or left) half of the eyewear (e.g. on or near the nose bridge) and a second image display is located on a sidepiece the half of the eyewear.

In another example, augmented reality eyewear can comprise two optical structures, one for each eye, wherein each optical structure comprises: a right-side image display; a left-side image display; a right-side proximal reflector; a left-side proximal reflector; and a distal arcuate reflector (e.g. transflective mirror), wherein light rays from the right-side image display are reflected by the right-side proximal reflector toward the distal arcuate reflector, wherein light rays from the left-side image display are reflected by the left-side proximal reflector toward the distal arcuate reflector, and wherein light rays from the right-side image display and the left-side image display are (partially) reflected by the distal arcuate reflector toward the eye.

In an example, augmented reality eyewear can comprise two optical structures, one for each eye, wherein each optical structure comprises: a upper (e.g. above a space in front of the eye) image display; a lower (e.g. below a space in front of the eye) image display; a upper proximal reflector; a lower proximal reflector; and a distal arcuate reflector (e.g. transflective mirror), wherein light rays from the upper image display are reflected by the upper proximal reflector toward the upper half of the distal arcuate reflector, wherein light rays from the lower image display are reflected by the lower proximal reflector toward the lower half of the distal arcuate reflector, and wherein light rays from the upper image display and the lower image display are (partially) reflected by the distal arcuate reflector toward the eye.

In an example, augmented reality eyewear can comprise two optical structures, one for each eye, wherein each optical structure comprises two image displays (e.g. light-emitting arrays or image sources), two proximal reflectors, and a distal arcuate reflector. In an example, a distal virtual image display can be to the left of (a space in front of) a person's eye and a proximal virtual image display can be to the right of (the space in front of) a person's eye. In an example, a first virtual image display can be above (a space in front of) a person's eye and a second virtual image display can be below (the space in front of) a person's eye. In another example, an optical structure for augmented reality can comprise a first light emitter (e.g. image display) which is above (a space in front of) an eye and a second light emitter (e.g. image display) which is below the (the space in front of) of the eye. In an example, an optical structure for each eye of augmented reality eyewear can comprise: a first (upper) image display on an upper portion of the structure (e.g. above eye level); and a second (lower) image display on a lower portion of the structure (e.g. below eye level).

In another example, an optical structure for each eye of augmented reality eyewear can comprise: a distal arcuate reflector (e.g. transflective mirror) and a ring of optical modules around the circumference of a space in front of an eye; wherein each optical module further comprises an image display, a waveguide (e.g. an internal reflection prism with a parallelogram cross-sectional shape), and a proximal reflector (e.g. with a triangular cross-sectional shape); wherein light rays from an image display are internally reflected multiple times within a waveguide before being reflected by a proximal reflector toward the distal arcuate reflector, and wherein light rays from the distal arcuate reflector are reflected proximally toward an eye.

In an example, an optical structure for each eye of augmented reality eyewear can comprise an annular array of coplanar image displays distributed around the circumference of a field of view of an eye, wherein light rays from the displays are combined to form one or more virtual images in the field of view. In another example, an optical structure for each eye of augmented reality eyewear can also include a ring of reflectors around the center of a field of view of an eye. In an example, an optical structure for each eye of augmented reality eyewear can also include an annular array of reflectors which is centered on the center of the field of view of an eye.

In an example, an optical structure for each eye of augmented reality eyewear can comprise: an annular array of image displays (e.g. image sources and/or light emitters) around the circumference of a field of view for an eye; an annular array of proximal reflectors; and a distal arcuate reflector (e.g. transflective mirror), wherein light rays from the annular array of image displays are directed toward the annular array of proximal reflectors, wherein the annular array of proximal reflectors reflect these light rays toward the distal arcuate reflector, and wherein the distal arcuate reflector reflects these light rays toward the eye.

In an example, a waveguide can be a total internal reflection prism. In an example, a waveguide can have internal reflection. In an example, a first (e.g. upper or right side) waveguide and a second (e.g. lower or left side) waveguide can meet together in the center of the field of view for an eye, wherein there is little (e.g. less than 1 mm) or no gap between them in the center of the field of view. In another example, there can be a gap between a first (e.g. upper or right side) waveguide and a second (e.g. lower or left side) waveguide in the center of the field of view for an eye, wherein this gap is between 10 and 30 mm.

In an example, a waveguide (e.g. internally-reflective polygonal prism) can have a quadrilateral cross-sectional shape. In another example, a waveguide can be tapered in a peripheral to center (e.g. center of field of vision for an eye) direction. In an example, a waveguide can have a first width in a portion of the waveguide which is closer to an image display and a second width in a portion of the waveguide which is farther from the image display (and closer to the center of the field of vision), and wherein the second width is less than the first width. In an example, a waveguide can have a parallelogram shape. In an example, a waveguide can have a quadrilateral longitudinal shape. In an example, a waveguide can have a rectangular cross-sectional shape.

In an example, a waveguide can have a trapezoidal cross-sectional shape. In another example, a waveguide can have a triangular cross-sectional shape. In an example, a waveguide can have an arcuate and/or curved wedge shape. In another example, an optical structure for each eye of augmented reality eyewear can comprise: an image display; a waveguide (e.g. internal reflection prism with a parallelogram cross-sectional shape); a proximal reflector (e.g. with a triangular cross-sectional shape); and a distal arcuate reflector (e.g. concave transflective mirror), wherein light rays from the image display are internally reflected multiple times within the waveguide before being reflected by the proximal reflector toward the distal arcuate reflector, and wherein light rays from the distal arcuate reflector are reflected proximally toward an eye.

In an example, an optical structure for each eye of augmented reality eyewear can comprise: a distal arcuate reflector (e.g. transflective mirror) and two optical modules on opposite sides of an eye (e.g. above and below, respectively, a space in front of the eye; or to the right and to the left, respectively, of a space in front of the eye); wherein each optical module further comprises an image display, a waveguide (e.g. internal reflection prism with a triangular or quadrilateral cross-sectional shape), and a proximal reflector (e.g. with a triangular or quadrilateral cross-sectional shape); wherein light rays from an image display are internally reflected multiple times within the waveguide before being reflected by a proximal reflector toward the distal arcuate reflector, wherein light rays from the distal arcuate reflector are reflected toward an eye, and wherein a waveguide and a proximal reflector are contiguous to each other.

In an example, an optical structure for each eye of augmented reality eyewear can comprise: a distal arcuate reflector (e.g. transflective mirror) and a plurality of optical modules around the circumference of a space in front of an eye; wherein each optical module further comprises an image display, a waveguide (e.g. an internal reflection prism with a parallelogram cross-sectional shape), and a proximal reflector (e.g. with a triangular cross-sectional shape); wherein light rays from an image display are internally reflected multiple times within a waveguide before being reflected by a proximal reflector toward the distal arcuate reflector, and wherein light rays from the distal arcuate reflector are reflected proximally toward an eye.

In an example, a distal waveguide and a proximal waveguide can at least partially overlap. In an example, augmented reality eyewear can comprise two optical structures, one for each eye, wherein each optical structure comprises two image displays (e.g. light-emitting arrays or image sources) and two waveguides (e.g. internal reflection prisms), wherein the two waveguides overlap (from distal-to-proximal perspective). In an example, augmented reality eyewear can comprise two optical structures, one for each eye, wherein each optical structure comprises two image displays (e.g. light-emitting arrays or image sources) and two waveguides (e.g. internal reflection prisms), wherein between 20% and 40% of the two waveguides overlap (from distal-to-proximal perspective) in a central portion of the optical structure. In an example, first and second waveguides do not overlap from a frontal perspective, wherein there is a central gap, hole, opening, and/or aperture between them, and wherein this gap, hole, opening, and/or aperture is between 4 mm and 40 mm in diameter.

In an example, a first reflection of light rays from an image display within a waveguide can be an internal reflection from a distal wall, edge, or surface of the waveguide. In another example, light rays from an image display can be externally reflected by a walls of a proximal reflector. In an example, light rays from the (first and second) image displays can be externally reflected by the walls of the (first and second, respectively) proximal reflectors. In another example, reflection of light rays from an image display within a waveguide can comprise a distal-proximal-distal sequence of internal reflections within the waveguide, wherein a proximal internal reflection is an internal reflection from a proximal wall, edge, or surface of the waveguide and a distal internal reflection is an internal reflection from a distal wall, edge, or surface of the waveguide.

In an example, a waveguide can comprise multiple (e.g. two) sections with different levels of reflectivity. In another example, a waveguide can comprise multiple (e.g. two) sections with different refractive indexes. In an example, a waveguide can comprise: a first section which is closer to the image display, wherein the first section has a first refractive index; and a second section which is farther from the image display, wherein the second section has a second refractive index, wherein the second refractive index is less than the first refractive index.

In an example, a distal arcuate reflector can comprise an aspheric transflective mirror. In an example, the shape of a distal arcuate reflector (e.g. transflective mirror) can be selected from the group consisting of: section of a sphere; section of a prolate sphere; section of an ellipsoid; section of a paraboloid; concave; and revolution of a conic section. In an example, a distal arcuate reflector can comprise a free-form transflective mirror. In an example, an optical structure for each eye of augmented reality eyewear can also include a geodesic transflective mirror. In an example, a distal arcuate reflector can reflect between 20% and 50% of incident light coming from the first and second image displays. In an example, a distal arcuate reflector can transmit between 40% and 70% of incident light coming from the environment to the eye.

In another example, an optical structure for each eye in augmented reality eyewear can comprise: a distal arcuate reflector (e.g. concave transflective mirror); two image displays at different locations on the circumference of a space directly in front of an eye; and two waveguides, wherein the two waveguides internally reflect light rays from the two image displays, respectively, multiple times before directing these light rays toward the distal arcuate reflector; and wherein the distal arcuate reflector partially reflects these light rays toward an eye and partially transmits light rays from the environment toward the eye.

In an example, an optical structure for each eye in augmented reality eyewear can comprise: two (e.g. right-side and left-side) image displays which emit light rays toward the center of the field of view for an eye; two proximal reflectors (e.g. mirrors and/or reflective prisms) which reflect these light rays away from the eye toward a distal arcuate reflector (e.g. transflective mirror); and the distal arcuate reflector which partially reflects these light rays toward the eye and partially transmits light rays from the environment to reach the eye.

In another example, an optical structure for each eye of augmented realty eyewear can comprise: a distal virtual image display; a proximal virtual image display; a distal internal-reflection waveguide; and a proximal internal-reflection waveguide; wherein light rays comprising a given pixel of an image from the distal virtual image display are reflected multiple times inside the distal internal-reflection waveguide before these light rays exit the proximal side of the distal internal-reflection waveguide and then pass through the proximal internal-reflection waveguide in order to reach the person's eye; wherein light rays comprising a given pixel of an image from the proximal virtual image display are reflected multiple times inside the proximal internal-reflection waveguide before these light rays exit the proximal side of the proximal internal-reflection waveguide in order to reach the person's eye; wherein light rays from the distal virtual image display and the proximal virtual image display create images of virtual objects in the person's field of view; and wherein light rays from the environment pass through both the distal internal-reflection waveguide and the proximal internal-reflection waveguide in order to reach the person's eye.

In an example, an optical structure for each eye of augmented reality eyewear can comprise: a first image display (e.g. image source) on a first side of a person's eye (e.g. above or to the right of a space directly in front of the eye); a second image display (e.g. image source) on a second side of the eye (e.g. below or to the left of the space directly in front of the eye) which is opposite the first side of the eye, wherein light rays from the first image display and light rays from the second image display show one or more virtual objects in the person's field of view; a first waveguide (e.g. internal reflection prism) which reflects light rays from the first image display multiple times before those light rays are directed toward the eye; and a second waveguide (e.g. internal reflection prism) which reflects light rays from the second image display multiple times before those light rays are directed toward the eye, wherein light rays from the environment pass through the first waveguide and/or the second waveguide to reach the person's eye.

In another example, between 75% and 95% of light beams from the environment to a person's eye which pass through a first waveguide can also pass through a second waveguide. In an example, a first image display can project light rays in a first direction and a second image display can project light rays in a second direction, wherein these directions are both toward the center of a field of view for an eye. In an example, an optical structure for each eye of augmented reality eyewear can comprise comprises an array of image displays which emit light rays in a radially-inward direction toward a near-eye area.

In an example, a first image display and a second image display can be symmetric with respect to a virtual plane (e.g. through the center of the field of view of an eye) and meet together in the center of the field of view of the eye. In an example, an optical structure for each eye of augmented reality eyewear can include a right-side set of components (comprising a right-side image display and a right-side waveguide) and a left-side set of components (comprising a left-side image display and a left-side waveguide), wherein the right-side set and the left-side set are asymmetric to each other with respect to reflection across a central vertical plane through the optical structure.

In an example, augmented reality eyewear can comprise a right-side optical structure near (e.g. in front of) the right eye and a left-side optical structure near (e.g. in front of) the left eye, wherein the right-side and left-side optical structures are symmetric to each other with respect to reflection across a sagittal plane (e.g. through the center of the person's head). In an example, a first image display and a second image display can be equal distances from the center of a field of view of an eye. In an example, a first waveguide and a second waveguide can both be the same distance from an eye. In another example, a waveguide can have an arcuate, concave, and tapered shape, becoming narrower with increasing distance from an image display.

In an example, a cross-sectional view of an optical structure for an eye of augmented reality eyewear can comprise: a distal arcuate reflector (e.g. a concave transflective mirror); a first image display on a first side of an eye (e.g. above a space in front of an eye or to the right of the space); a first proximal waveguide (e.g. internal reflection prism); a first proximal reflector (e.g. a first reflective prism); a second image display on a second side of an eye which is opposite the first side of the eye (e.g. below the space in front of the eye or to the left of the space in front of the eye); a second proximal waveguide (e.g. internal reflection prism); and a second proximal reflector (e.g. a second reflective prism); wherein light rays from the first image display are internally-reflected multiple times within the first waveguide before being reflected by the first proximal reflector toward the distal arcuate reflector and then reflected by the distal arcuate reflector toward the eye; and wherein light rays from the second image display are internally-reflected multiple times within the second waveguide before being reflected by the second proximal reflector toward the distal arcuate reflector and then reflected by the distal arcuate reflector toward the eye.

In another example, a first plane is a virtual plane which best fits the image-generating side (e.g. surface) of an image display and a second plane is a virtual plane which best fits longitudinal axes of a waveguide, wherein the first and second planes are coplanar. In an example, a first plane is a virtual plane which best fits the image-generating side (e.g. surface) of an image display and a second plane is a virtual plane which best fits longitudinal axes of a waveguide, wherein the first and second planes intersect at an angle in the range of 35 to 55 degrees. In another example, a proximal edge, wall, or side of a waveguide can comprises a single plane and a distal edge, wall or side of a waveguide can comprise two perpendicular planes which connect to each other.

In an example, a waveguide can comprise two sections made from different materials, wherein a first plane is the virtual plane which best fits the interface between the two sections, wherein a second plane is the virtual plane which is substantially orthogonal to a vector which extends straight forward from the center of the eye, and wherein the first plane intersects the second plane at an acute angle. In an example, a waveguide can comprise two sections made from different materials, wherein a first plane is the virtual plane which best fits the interface between the two sections, wherein a second plane is the virtual plane which best fits the front piece of the eyewear, and wherein the first plane intersects the second plane at an angle between 15 and 35 degrees.

In an example, a waveguide can comprise two sections made from different materials, wherein a virtual plane best fits the interface between the two sections, wherein the virtual plane intersects the longitudinal axis of the waveguide at an angle between 25 and 55 degrees. In an example, a waveguide can comprise two sections with different refractive indexes, wherein a first plane is the virtual plane which best fits the interface between the two sections, wherein a second plane is the virtual plane which is substantially orthogonal to a vector which extends straight forward from the center of the eye, and wherein the first plane intersects the second plane at an acute angle.

In an example, a waveguide can comprise two sections with different refractive indexes, wherein a first plane is the virtual plane which best fits the interface between the two sections, wherein a second plane is the virtual plane which best fits the front piece of the eyewear, and wherein the first plane intersects the second plane at an angle between 15 and 35 degrees. In an example, an optical structure for each eye of augmented reality eyewear can comprise an array of coplanar image displays distributed around the circumference of a space directly in front of an eye, wherein light rays from the displays are combined to form one or more virtual images in the field of view. In an example, light rays from a primary image display are projected into a central area of the field of view of an eye and light rays from a plurality of secondary image displays are projected into peripheral areas of the field of view of the eye. In another example, together, light rays from first and second image displays can form a virtual image in a person's field of view.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein the first area and the second area overlap. In another example, an optical structure for each eye of augmented reality eyewear can comprise an array of image displays distributed around the circumference of a space directly in front of an eye, wherein light rays from the displays are combined to form one or more virtual images in the field of view.

In an example, images from first and a second image displays can overlap on a central portion of a distal arcuate reflector (e.g. transflective mirror), wherein between 30% and 60% of images from the first and second images displays overlap on the distal arcuate reflector. In another example, light rays from a right-side image display and light rays from a left-side image display can overlap and/or combine together to create a virtual image. In an example, some of the light rays from a first image display and a second image display can overlap when they reach a distal arcuate reflector (e.g. transflective mirror), wherein between 5% and 25% of the images from the first and second images displays can overlap on distal arcuate reflector.

In an example, images from first and a second image displays can overlap on a central portion of a distal arcuate reflector (e.g. transflective mirror), wherein between 20% and 40% of images from the first and second images displays overlap on the distal arcuate reflector, wherein (portions of) images in the central overlapping area have greater resolution, greater brightness, and/or greater opacity than (portions of) images in peripheral non-overlapping areas. In an example, light rays from a first image display and a second image display can overlap when they reach a distal arcuate reflector (e.g. transflective mirror), wherein (portions of) images in the central overlapping area have greater resolution, greater brightness, and/or greater opacity than (portions of) images in peripheral non-overlapping areas.

In an example, a right portion (e.g. right half) of a convex lens can redirect light rays from a right-side image display toward a person's eye and a left portion (e.g. left half) of a convex lens can redirect light rays from a left-side image display toward the person's eye. In an example, an optical structure for each eye of augmented reality eyewear can comprise: a first image display; a second image display; a first waveguide which internally reflects light from the first image display; a second waveguide which internally reflects light from the second image display; and a lens which refracts light from both image displays. In an example, an optical structure for each eye of augmented reality eyewear can comprise the following proximal-to-distal sequence of optical components: a first waveguide (e.g. internal reflection prism) and a second waveguide (e.g. internal reflection prism); a first image display and a second image display; a lens; and a distal arcuate reflector (e.g. transflective mirror); wherein proximal means closer to an eye and distal means farther from the eye.

In an example, an optical structure for each eye of augmented reality eyewear can comprise the following proximal-to-distal sequence of optical components: a lens; a first reflector and a second reflector; a first image display and a second image display; and a distal arcuate reflector (e.g. transflective mirror); wherein proximal means closer to an eye and distal means farther from the eye. In another example, an optical structure for each eye of augmented reality eyewear can further comprise a Fresnel lens. In an example, an optical structure for each eye of augmented reality eyewear can comprise: a first image display; a second image display; a first waveguide which internally reflects light from the first image display; a second waveguide which internally reflects light from the second image display; and a lens.

In another example, an optical structure for each eye of augmented reality eyewear can further comprise a first lens which is located between a first image display and a first reflector and a second lens which is between a second image display and a second reflector. In an example, an optical structure for each eye of augmented reality eyewear can further comprise a Fresnel lens which is located between a distal arcuate reflector (e.g. transflective mirror) and the eye. In another example, an optical structure for each eye of augmented reality eyewear can further comprise a lens between a waveguide and a distal arcuate reflector.

In an example, an optical structure for each eye of augmented reality eyewear can further comprise an actuator which rotates, tilts, and/or pivots a waveguide (e.g. internal reflection prism). In an example, an optical structure for each eye of augmented reality eyewear can further comprise an actuator which changes the distance between a waveguide (e.g. internal reflection prism) and a lens based on eye movement to change the focal plane and/or focal distance of virtual objects in a person's field of view. In an example, an optical structure for each eye of augmented reality eyewear can further comprise an actuator which changes the distance between a waveguide (e.g. internal reflection prism) and a lens.

In an example, an optical structure for each eye of augmented reality eyewear can further comprise an actuator which changes the distance between a proximal reflector and a lens to change the focal plane and/or focal distance of virtual objects in a person's field of view. In an example, an optical structure for each eye of augmented reality eyewear can further comprise an actuator which changes (e.g. adjusts) the distance between a light emitter and a waveguide to change the focal plane and/or distance at which virtual objects are observed. In an example, an optical structure for each eye of augmented reality eyewear can further comprise an actuator which changes (e.g. adjusts) the distance between a light emitter and a proximal reflector to change the focal plane and/or distance at which virtual objects are observed.

In an example, an optical structure for each eye of augmented reality eyewear can further comprise an actuator which changes the distance between a light emitter and a lens to change the focal plane and/or focal distance of virtual objects in a person's field of view. In an example, an optical structure for each eye of augmented reality eyewear can further comprise an actuator which changes the distance between a distal arcuate reflector (e.g. transflective mirror) and a lens based on eye movement to change the focal plane and/or focal distance of virtual objects in a person's field of view. In another example, an optical structure for each eye of augmented reality eyewear can further comprise an actuator which rotates, tilts, and/or pivots a waveguide (e.g. internal reflection prism) based on eye movement to change the focal plane and/or distance at which virtual objects are observed.

In an example, an optical structure for each eye of augmented reality eyewear can further comprise an actuator which rotates, tilts, and/or pivots a light emitter to change the focal plane and/or distance at which virtual objects are observed. In another example, an optical structure for each eye of augmented reality eyewear can further comprise an actuator which rotates, tilts, and/or pivots a distal arcuate reflector (e.g. transflective mirror) based on eye movement to change the focal plane and/or distance at which virtual objects are observed. In an example, an optical structure for each eye of augmented reality eyewear can further comprise an actuator which rotates, tilts, and/or pivots a light emitter.

In another example, an optical structure for each eye of augmented reality eyewear can further comprise one or more polarization filters. In an example, an optical structure can further comprise a movable mirror and/or micromirror array. In an example, an optical structure for each eye of augmented reality eyewear can also include a Fresnel reflector. In an example, light rays from a right-side image display can reach a person's eye primarily via reflection from a right-side beam splitter and light rays from a left-side image display can reach a person's eye primarily via reflection from a left-side beam splitter.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein the first area is more central to the field of view from an eye than the second area.

In an example, an optical structure for each eye in augmented reality eyewear can comprise: a distal arcuate reflector (e.g. transflective mirror); a first image display; a first series of reflective surfaces, wherein light rays from the first image display are reflected multiple times in an alternating proximal-then-distal directions by the first series of reflective surfaces before they are directed toward the distal arcuate reflector; a second image display; a second series of reflective surfaces, wherein light rays from the second image display are reflected multiple times in an alternating proximal-then-distal directions by the second series of reflective surfaces before they are directed toward the distal arcuate reflector; and wherein light rays from the first image display and from the second image display are reflected by the distal arcuate reflector toward an eye.

In an example, an optical structure for each eye in augmented reality eyewear can comprise: a distal arcuate reflector (e.g. transflective mirror); a first image display above a space directly in front of an eye; a first series of reflective surfaces, wherein light rays from the first image display are reflected multiple times by the first series of reflective surfaces before they are directed toward the distal arcuate reflector; a second image display below the space directly in front of the eye; a second series of reflective surfaces, wherein light rays from the second image display are reflected multiple times by the second series of reflective surfaces before they are directed toward the distal arcuate reflector; and wherein light rays from the first image display and from the second image display are reflected by the distal arcuate reflector toward an eye.

In an example, an optical structure for each eye in augmented reality eyewear can comprise: two image displays at different locations (e.g. upper and lower, or right and left) on the circumference of a space directly in front of an eye; and two waveguides, wherein the two waveguides internally reflect light rays from the two image displays, respectively, multiple times before directing the light rays toward the eye. In another example, an optical structure for each eye of augmented reality eyewear can comprise: a first image display on a first side of a person's eye; a second image display on a second side of the eye which is opposite the first side of the eye, wherein light rays from the first image display and light rays from the second image display show one or more virtual objects in the person's field of view; a first waveguide which reflects light rays from the first image display multiple times before those light rays are directed toward the eye; and a second waveguide which reflects light rays from the second image display multiple times before those light rays are directed toward the eye.

In an example, augmented reality eyewear can comprise two optical structures, one for each eye, wherein each optical structure comprises two image displays (e.g. light-emitting arrays or image sources) and two waveguides (e.g. internal reflection prisms), and wherein the two waveguides internally reflect light rays from the two image displays (respectively) multiple times before the light rays are directed toward the eye. In another example, augmented reality eyewear can comprise two optical structures, one for each eye, wherein each optical structure comprises two image displays (e.g. light-emitting arrays or image sources)

and two waveguides (e.g. internal reflection prisms), wherein the two waveguides internally reflect light rays from the two image displays (respectively) multiple times before the light rays are directed toward the eye, and wherein a first image display is located to the right of (a space directly in front of) an eye and a second image display is located to the left of (the space directly in front of) the eye.

In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein the two waveguides internally reflect light rays from the two image displays (respectively) multiple times before the light rays are directed toward the distal arcuate reflector, where the distal arcuate reflector (partially) reflects these light rays toward the eye, and wherein a first image display is located above (a space directly in front of) an eye and a second image display is located below (the space directly in front of) the eye.

In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein the two waveguides internally reflect light rays from the two image displays (respectively) multiple times before the light rays are directed toward the distal arcuate reflector, where the distal arcuate reflector (partially) reflects these light rays toward the eye, and wherein a first image display is located on the rim of (a right or left) half of the eyewear (e.g. on or near the nose bridge) and a second image display is located on a sidepiece the half of the eyewear.

In an example, a waveguide and a proximal reflector in a given optical module and/or on a given side of a space in front of an eye can share a common wall. In an example, an optical structure for each eye in augmented reality eyewear can comprise: a distal arcuate reflector (e.g. concave transflective mirror); four image displays at different locations on the circumference of a space directly in front of an eye; and four waveguides, wherein the four waveguides internally reflect light rays from the four image displays, respectively, multiple times before directing these light rays toward the distal arcuate reflector; and wherein the distal arcuate reflector partially reflects these light rays toward an eye and partially transmits light rays from the environment toward the eye.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein a third area is defined as the area where the first area and the second area overlap, wherein a fourth area is defined as the sum of the first area and the second area, and wherein the size of third area is between 15% and 40% of the size of the fourth area.

In an example, an optical structure for each eye in augmented reality eyewear can comprise: four image displays at different locations on the circumference of a space directly in front of an eye; and four waveguides, wherein the four waveguides internally reflect light rays from the four image displays, respectively, multiple times before directing the light rays toward the eye. In an example, an optical structure for each eye of augmented reality eyewear can comprise an array of six image displays distributed around the circumference of a space directly in front of an eye. In another example, an optical structure for each eye of augmented reality eyewear can comprise an array of four image displays distributed around the circumference of a space directly in front of an eye.

In an example, augmented reality eyewear can comprise two optical structures, one for each eye, wherein each optical structure comprises two image displays (e.g. light-emitting arrays or image sources) and two waveguides (e.g. internal reflection prisms), wherein a first image display is located above (a space directly in front of) an eye and a second image display is located below (the space directly in front of) the eye. In another example, augmented reality eyewear can comprise two optical structures, one for each eye, wherein each optical structure comprises two image displays (e.g. light-emitting arrays or image sources) and two waveguides (e.g. internal reflection prisms), wherein a first image display is located on the rim of (a right or left) half of the eyewear (e.g. on or near the nose bridge) and a second image display is located on a sidepiece the half of the eyewear.

In an example, augmented reality eyewear can comprise two optical structures, one for each eye, wherein each optical structure comprises two image displays (e.g. light-emitting arrays or image sources), a distal arcuate reflector (e.g. concave transflective mirror), and two waveguides (e.g. internal reflection prisms), wherein a first image display is located on the upper rim of (a right or left) half of the eyewear and a second image display is located on the lower rim of the half of the eyewear.

In another example, augmented reality eyewear can comprise two optical structures, one for each eye, wherein each optical structure comprises: a first image display; a second image display; a first proximal reflector; a second proximal reflector; and a distal arcuate reflector (e.g. transflective mirror), wherein light rays from the first image display are reflected by the first proximal reflector toward the distal arcuate reflector, wherein light rays from the second image display are reflected by the second proximal reflector toward the distal arcuate reflector, and wherein light rays from the first image display and the second image display are (partially) reflected by the distal arcuate reflector toward the eye.

In an example, augmented reality eyewear can comprise two optical structures, one for each eye, wherein each optical structure comprises: a right-side image display; a left-side image display; a right-side proximal reflector; a left-side proximal reflector; and a distal arcuate reflector (e.g. transflective mirror), wherein light rays from the right-side image display are reflected by the right-side proximal reflector toward the right half of the distal arcuate reflector, wherein light rays from the left-side image display are reflected by the left-side proximal reflector toward left half of the distal arcuate reflector, and wherein light rays from the right-side image display and the left-side image display are (partially) reflected by the distal arcuate reflector toward the eye. In an example, the first side can be above (a space in front of) an eye and the second side can be below (the space in front of) the eye.

In an example, an image display can comprise a one or more optical components selected from the group consisting of: active matrix organic light-emitting diode array; beam generator; holographic optical element; holographic projector; laser array; Light Emitting Diode (LED) array; Lightning Bug Array (LBA); Liquid Crystal Display (LCD); micro OLED array; micro-display;

micromirror array; optoelectronic display; Organic Light Emitting Diode (OLED) array; and passive matrix light-emitting diode array.

In an example, a distal virtual image display can be above (a space in front of) a person's eye and a proximal virtual image display can be below (the space in front of) a person's eye. In an example, a distal virtual image display can be to the right of (a space in front of) a person's eye and a proximal virtual image display can be to the left of (the space in front of) a person's eye. In an example, a first virtual image display can be to the right of (a space in front of) a person's eye and a second virtual image display can be to the left of (the space in front of) a person's eye. In an example, an optical structure for each eye of augmented reality eyewear can comprise: a first (upper) image display above the center of the optical structure; and a second (lower) image display below the center of the optical structure).

In another example, a cross-sectional view of an optical structure for an eye of augmented reality eyewear can comprise: a distal arcuate reflector (e.g. concave transflective mirror); and an annular array (e.g. ring) of optical modules; wherein each optical module further comprises an image display, a waveguide (e.g. internal reflection prism), and a proximal reflector; and wherein light rays from an image display are internally-reflected multiple times by a waveguide before being redirected by a proximal reflector toward the distal arcuate reflector.

In an example, an optical structure for each eye of augmented reality eyewear can comprise: a distal arcuate reflector (e.g. transflective mirror) and an annular array of optical modules around the circumference of a space in front of an eye; wherein each optical module further comprises an image display, a waveguide (e.g. an internal reflection prism with a parallelogram cross-sectional shape), and a proximal reflector (e.g. with a triangular cross-sectional shape); wherein light rays from an image display are internally reflected multiple times within a waveguide before being reflected by a proximal reflector toward the distal arcuate reflector, and wherein light rays from the distal arcuate reflector are reflected proximally toward an eye.

In another example, an optical structure for each eye of augmented reality eyewear can comprise an annular array of coplanar image displays distributed around the circumference of a space directly in front of an eye, wherein light rays from the displays are combined to form one or more virtual images in the field of view. In an example, an optical structure for each eye of augmented reality eyewear can also include an annular reflector. In another example, an optical structure for each eye of augmented reality eyewear can comprise an annular array of image displays (e.g. image sources and/or light emitters) around the circumference of a field of view for an eye. In an example, an optical structure for each eye of augmented reality eyewear can comprise comprises an annular array (e.g. a ring) of image displays around the circumference of a near-eye area.

In an example, a waveguide can be an arcuate prism. In an example, first and second waveguides can be the same length, size, and shape—but span different portions (e.g. upper half and lower half, or right half and left half) of a field of vision of an eye. In an example, a first waveguide and a second waveguide can meet together in the center of the field of view of an eye.

In an example, a waveguide (e.g. internally-reflective polygonal prism) can have a triangular cross-sectional shape. In an example, a waveguide (e.g. internally-reflective polygonal prism) can have a parallelogram cross-sectional shape. In an example, a waveguide can be tapered in a peripheral to center direction. In another example, a waveguide can have a parallelogram cross-sectional shape. In an example, a waveguide can have a quadrilateral cross-sectional shape. In another example, a waveguide can have a quadrilateral longitudinal shape. In an example, a waveguide can have a rectangular longitudinal shape. In another example, a waveguide can have a trapezoidal longitudinal shape. In an example, a waveguide can have a triangular longitudinal shape.

In an example, an optical structure for each eye of augmented reality eyewear can comprise: a distal arcuate reflector (e.g. transflective mirror) and two optical modules on opposite sides of an eye (e.g. above and below, respectively, a space in front of the eye; or to the right and to the left, respectively, of a space in front of the eye); wherein each optical module further comprises an image display and a waveguide (e.g. internal reflection prism with a triangular or quadrilateral cross-sectional shape); wherein light rays from an image display are internally reflected multiple times within the waveguide before being reflected toward the distal arcuate reflector, and wherein light rays from the distal arcuate reflector are reflected toward an eye.

In an example, an optical structure for each eye of augmented reality eyewear can comprise: a distal arcuate reflector (e.g. transflective mirror) and two optical modules; wherein each optical module further comprises an image display, a waveguide (e.g. internal reflection prism with a triangular or quadrilateral cross-sectional shape), and a proximal reflector (e.g. with a triangular or quadrilateral cross-sectional shape); wherein light rays from an image display are internally reflected multiple times within the waveguide before being reflected by a proximal reflector toward the distal arcuate reflector, and wherein light rays from the distal arcuate reflector are reflected toward an eye.

In an example, an optical structure for each eye of augmented reality eyewear can comprise: a distal arcuate reflector (e.g. transflective mirror) and two optical modules; wherein each optical module further comprises an image display, a waveguide (e.g. an internal reflection prism with a parallelogram cross-sectional shape), and a proximal reflector (e.g. with a triangular cross-sectional shape); wherein light rays from an image display are internally reflected multiple times within a waveguide before being reflected by a proximal reflector toward the distal arcuate reflector, and wherein light rays from the distal arcuate reflector are reflected proximally toward an eye. In an example, the proximal reflectors can be polygonal prisms (e.g. with triangular or quadrilateral cross-sectional shapes).

In an example, a distal waveguide and a proximal waveguide may not overlap. In an example, augmented reality eyewear can comprise two optical structures, one for each eye, wherein each optical structure comprises two image displays (e.g. light-emitting arrays or image sources) and two waveguides (e.g. internal reflection prisms), wherein the two waveguides do not overlap (from distal-to-proximal perspective). In an example, augmented reality eyewear can comprise two optical structures, one for each eye, wherein each optical structure comprises two image displays (e.g. light-emitting arrays or image sources) and two waveguides (e.g. internal reflection prisms), wherein between 30% and 60% of the two waveguides overlap (from distal-to-proximal perspective) in a central portion of the optical structure. In an example, first and second waveguides do not overlap from a frontal perspective, wherein there is a central circular gap, hole, opening, and/or aperture between them, and wherein this circular gap, hole, opening, and/or aperture is between 4 mm and 40 mm in diameter.

In another example, a waveguide can have internal reflection, wherein internal reflection means that light rays are generally contained within the waveguide by internal reflection, but can still escape from within the waveguide at when they reach an exterior wall of the waveguide at (or above) a selected incidence angle. In an example, light rays from the (first and second) image displays can be internally reflected (e.g. multiple times) by the walls of the (first and second, respectively) waveguides. In another example, reflection of light rays from an image display within a waveguide can comprise an sequence of internal reflections which alternates between reflection from a proximal wall, edge, or surface of waveguide and reflection from a distal wall, edge, or surface of the waveguide. In an example, the distal surface, edge, and/or wall of a waveguide can have a shape selected from the group consisting of: spheroid; conic section; proximally-concave; and angled straight line.

In another example, a waveguide can comprise: a first section which is closer to the image display, wherein the first section has a first reflectivity level; and a second section which is farther from the image display, wherein the second section has a second reflectivity level, wherein the second reflectivity level is greater than the first reflectivity level. In an example, a waveguide can comprise multiple (e.g. two) sections with different levels of refraction. In an example, a distal arcuate reflector can be a transflective (e.g. partially transmissive and partially reflective) mirror. In an example, a distal arcuate reflector can have a shape which is selected from the group consisting of: section of a sphere, section of an ellipsoid, conic section, proximally concave, spheroid, and section of an oblate sphere.

In an example, a distal arcuate reflector can be a spheroid mirror; wherein spheroid means having a shape which is a portion of a sphere, an ellipsoid, or an prolate sphere; and wherein transflective means partially transmitting light and partially reflecting light. In an example, a distal arcuate reflector can have a shape which is a conic section. In an example, an optical structure for each eye of augmented reality eyewear can also include a geodesic reflective surface. In another example, a distal arcuate reflector can reflect between 40% and 70% of incident light coming from the first and second image displays.

In an example, an optical structure for each eye in augmented reality eyewear can comprise: two (e.g. upper and lower) image displays which emit light rays toward the center of the field of view for an eye; two proximal waveguides (e.g. internal reflection prisms) which internally reflect these light rays multiple times before reflecting them away from the eye toward a distal arcuate reflector (e.g. transflective mirror); and the distal arcuate reflector which partially reflects these light rays toward the eye and partially transmits light rays from the environment to reach the eye.

In another example, an optical structure for each eye in augmented reality eyewear can comprise: a distal arcuate reflector (e.g. concave transflective mirror); two image displays at different locations (e.g. upper and lower, or right and left) on the circumference of a space directly in front of an eye; and two waveguides, wherein the two waveguides internally reflect light rays from the two image displays, respectively, multiple times before directing these light rays toward the distal arcuate reflector; and wherein the distal arcuate reflector partially reflects these light rays toward an eye and partially transmits light rays from the environment toward the eye.

In another example, an optical structure for each eye of augmented realty eyewear can comprise: a distal virtual image display (e.g. first image display and/or image source); a proximal virtual image display (e.g. second image display and/or image source); a distal internal-reflection waveguide (e.g. first waveguide and/or internal reflection prism); and a proximal internal-reflection waveguide (e.g. second waveguide and/or internal reflection prism); wherein light rays comprising a given pixel of an image from the distal virtual image display are reflected multiple times inside the distal internal-reflection waveguide before these light rays exit the distal internal-reflection waveguide to reach the person's eye; wherein light rays comprising a given pixel of an image from the proximal virtual image display are reflected multiple times inside the proximal internal-reflection waveguide before these light rays exit the proximal internal-reflection waveguide to reach the person's eye; wherein light rays from the distal virtual image display and the proximal virtual image display create images of virtual objects in the person's field of view; and wherein light rays from the environment pass through the distal internal-reflection waveguide and/or the proximal internal-reflection waveguide to reach the person's eye.

In an example, an optical structure for each eye of augmented realty eyewear can comprise: a distal virtual image display; a proximal virtual image display; a distal internal-reflection waveguide; and a proximal internal-reflection waveguide; wherein light rays comprising a given pixel of an image from the distal virtual image display are reflected multiple times inside the distal internal-reflection waveguide before these light rays exit the proximal side of the distal internal-reflection waveguide and then pass through the proximal internal-reflection waveguide in order to reach the person's eye; wherein light rays comprising a given pixel of an image from the proximal virtual image display are reflected multiple times inside the proximal internal-reflection waveguide before these light rays exit the proximal side of the proximal internal-reflection waveguide in order to reach the person's eye; wherein light rays from the distal virtual image display and the proximal virtual image display create images of virtual objects in the person's field of view; and wherein light rays from the environment pass through both the distal internal-reflection waveguide and the proximal internal-reflection waveguide in order to reach the person's eye. In an example, between 5% and 35% of light beams from the environment to a person's eye which pass through a first waveguide can also pass through a second waveguide. In an example, first and second waveguides can overlap from a frontal perspective, wherein substantially all light beams from the environment to a person's eye which pass through a first waveguide also pass through a second waveguide.

In an example, a first image display can project light rays in a first direction and a second image display can project light rays in a second direction, wherein these directions are both toward the center of a field of view for an eye, wherein the first direction is from the right side of the eye toward the center of the field of view, and the second direction is from the left side of the eye toward the center of the field of view. In an example, augmented reality eyewear can comprise two optical structures, one for each eye, wherein each optical structure comprises two image displays (e.g. light-emitting arrays or image sources), two proximal reflectors, and a distal arcuate reflector (e.g. transflective mirror), wherein light rays from the two images displays are reflected in a distal direction (e.g. away from an eye) toward the distal arcuate reflector by the proximal reflectors, and wherein these light rays are then (partially) reflected toward the eye by the distal arcuate reflector.

In an example, a first waveguide and a second waveguide can be symmetric with respect to a vertical plane through the center of the field of view of an eye. In an example, an optical structure for each eye of augmented reality eyewear can include an upper set of components (comprising an upper image display and an upper waveguide) and a lower set of components (comprising a lower image display and a lower waveguide), wherein the upper set and the lower set are symmetric to each other with respect to reflection across a central horizontal plane through the optical structure. In another example, the optical structure for augmented reality eyewear described herein can be for one eye, with the understanding that the eyewear can also include a similar (e.g. a sagittally-symmetric) optical structure for the other eye. In an example, a first image display and a second image display can both be the same distance from an eye. In another example, a waveguide can have a tapered shape, becoming narrower with increasing distance from an image display. In an example, the centroid of a first image display and the centroid of a second image display can both be the same distance from an eye.

In another example, a distal edge, wall, or side of a waveguide can be an angular combination of two intersecting planes. In an example, a first plane is a virtual plane which best fits the image-generating side (e.g. surface) of an image display and a second plane is a virtual plane which best fits longitudinal axes of a waveguide, wherein the first and second planes intersect at an acute angle. In an example, a first waveguide and a second waveguide can be coplanar. In an example, a proximal edge, wall, or side of a waveguide can comprises a single plane and a distal edge, wall or side of a waveguide can comprise two planes which form an obtuse angle as they connect to each other.

In an example, a waveguide can comprise two sections made from different materials, wherein a first plane is the virtual plane which best fits the interface between the two sections, wherein a second plane is the virtual plane which is substantially orthogonal to a vector which extends straight forward from the center of the eye, and wherein the first plane intersects the second plane at an angle between 15 and 35 degrees. In an example, a waveguide can comprise two sections made from different materials, wherein a first plane is the virtual plane which best fits the interface between the two sections, wherein a second plane is the virtual plane which best fits the front piece of the eyewear, and wherein the first plane intersects the second plane at an angle between 25 and 55 degrees. In another example, a waveguide can comprise two sections with different refractive indexes, wherein a virtual plane best fits the interface between the two sections, wherein the virtual plane intersects the longitudinal axis of the waveguide at an angle between 15 and 35 degrees.

In an example, a waveguide can comprise two sections with different refractive indexes, wherein a first plane is the virtual plane which best fits the interface between the two sections, wherein a second plane is the virtual plane which is substantially orthogonal to a vector which extends straight forward from the center of the eye, and wherein the first plane intersects the second plane at an angle between 15 and 35 degrees. In another example, a waveguide can comprise two sections with different refractive indexes, wherein a first plane is the virtual plane which best fits the interface between the two sections, wherein a second plane is the virtual plane which best fits the front piece of the eyewear, and wherein the first plane intersects the second plane at an angle between 25 and 55 degrees.

In an example, a first image display can display virtual images (e.g. objects or text) in a first portion of a field of view for an eye and a second image display can display virtual objects (e.g. objects or text) in a second portion of the field of view. In an example, light rays from a right-side image display can reach a person's eye primarily via reflection from a right-side portion (e.g. right half) of a distal arcuate reflector (e.g. concave transflective mirror) and light rays from a left-side image display can reach a person's eye primarily via reflection from a left-side portion (e.g. left half) of the distal arcuate reflector (e.g. concave transflective mirror). In an example, a first image display can project a first portion of a virtual image and a second image display can project a second portion of the virtual image.

In an example, an optical structure for each eye of augmented reality eyewear can also include an optical combiner. In another example, images from first and a second image displays can overlap on a central portion of a distal arcuate reflector (e.g. transflective mirror), wherein between 5% and 25% of images from the first and second images displays overlap on the distal arcuate reflector. In an example, light beams from a first image display and a second image display can combine and/or compound to show one or more virtual images, scenes, and/or objects in a person's field of view. In another example, light rays from an upper image display and light rays from a lower image display can overlap and/or combine together to create a virtual image.

In an example, an optical structure for each eye of augmented reality eyewear can comprise: a distal arcuate reflector (e.g. distal concave transflective mirror); a first image display (e.g. first image source or array of light emitters), wherein light rays from the first image display shine on (e.g. illuminate, reflect from, hit, or span) a first area of the (proximal surface of the) distal arcuate reflector; and a second image display (e.g. second image source or array of light emitters), wherein light rays from the second image display shine on (e.g. illuminate, reflect from, hit, or span) a second area of the (proximal surface of the) distal arcuate reflector; wherein a third area is defined as the area where the first area and the second area overlap, and wherein (portions of) virtual images (e.g. objects or text) in the third area have higher levels of resolution, brightness, and/or opacity than (portions of) virtual images (e.g. objects or text) in the first or second areas.

In an example, images from first and a second image displays can overlap on a central portion of a distal arcuate reflector (e.g. transflective mirror), wherein between 30% and 60% of images from the first and second images displays overlap on the distal arcuate reflector, wherein (portions of) images in the central overlapping area have greater resolution, greater brightness, and/or greater opacity than (portions of) images in peripheral non-overlapping areas. In an example, some of the light rays from a first image display and a second image display can overlap when they reach a distal arcuate reflector (e.g. transflective mirror), wherein between 5% and 25% of the images from the first and second images displays can overlap on distal arcuate reflector, wherein (portions of) images in the central overlapping area have greater resolution, greater brightness, and/or greater opacity than (portions of) images in peripheral non-overlapping areas.

In an example, an optical structure for each eye in augmented reality eyewear can also include an array of movable (e.g. rotatable and/or tiltable) microlenses. In an example, an optical structure for each eye of augmented reality eyewear can further comprise two lenses which are located between a distal arcuate reflector (e.g. transflective mirror) and the eye. In another example, an optical structure for each eye of augmented reality eyewear can comprise the following proximal-to-distal sequence of optical components: a first reflector and a second reflector; a first image display and a second image display; a lens; and a distal arcuate reflector (e.g. transflective mirror); wherein proximal means closer to an eye and distal means farther from the eye.

In an example, an optical structure for each eye of augmented reality eyewear can comprise the following proximal-to-distal sequence of optical components: a lens; a first image display and a second image display; a first waveguide (e.g. internal reflection prism) and a second waveguide (e.g. internal reflection prism); and a distal arcuate reflector (e.g. transflective mirror); wherein proximal means closer to an eye and distal means farther from the eye. In an example, an optical structure for each eye of augmented reality eyewear can further comprise a metamaterial lens. In an example, an optical structure for each eye of augmented reality eyewear can further comprise a first lens which is located between a first image display and a first waveguide and a second lens which is between a second image display and a second waveguide.

In an example, an optical structure for each eye of augmented reality eyewear can further comprise a first Fresnel lens which is located between a first image display and a first reflector and a second Fresnel lens which is between a second image display and a second reflector. In an example, an optical structure for each eye of augmented reality eyewear can further comprise a lens between an image display and a waveguide. In another example, an optical structure for each eye of augmented reality eyewear can further comprise a lens between a distal arcuate reflector and an eye.

In an example, an optical structure for each eye of augmented reality eyewear can further comprise an actuator which rotates, tilts, and/or pivots a lens to change the focal plane and/or focal distance of virtual objects in a person's field of view. In another example, an optical structure for each eye of augmented reality eyewear can further comprise an actuator which changes (e.g. adjusts) the distance between a waveguide (e.g. internal reflection prism) and a distal arcuate reflector (e.g. transflective mirror) to change the focal plane and/or distance at which virtual objects are observed. In an example, an optical structure for each eye of augmented reality eyewear can further comprise an actuator which changes (e.g. adjusts) the distance between a waveguide (e.g. internal reflection prism) and a distal arcuate reflector (e.g. transflective mirror).

In an example, an optical structure for each eye of augmented reality eyewear can further comprise an actuator which changes the distance between a proximal reflector and a lens based on eye movement to change the focal plane and/or focal distance of virtual objects in a person's field of view. In an example, an optical structure for each eye of augmented reality eyewear can further comprise an actuator which changes (e.g. adjusts) the distance between a light emitter and a waveguide based on eye movement to change the focal plane and/or distance at which virtual objects are observed. In an example, an optical structure for each eye of augmented reality eyewear can further comprise an actuator which changes (e.g. adjusts) the distance between a light emitter and a proximal reflector based on eye movement to change the focal plane and/or distance at which virtual objects are observed.

In an example, an optical structure for each eye of augmented reality eyewear can further comprise an actuator which changes the distance between a light emitter and a lens based on eye movement to change the focal plane and/or focal distance of virtual objects in a person's field of view. In another example, an optical structure for each eye of augmented reality eyewear can further comprise an actuator which changes the distance between a distal arcuate reflector (e.g. transflective mirror) and a lens. In an example, an optical structure for each eye of augmented reality eyewear can further comprise an actuator which rotates, tilts, and/or pivots a proximal reflector to change the focal plane and/or distance at which virtual objects are observed. In an example, an optical structure for each eye of augmented reality eyewear can further comprise an actuator which rotates, tilts, and/or pivots a light emitter based on eye movement to change the focal plane and/or distance at which virtual objects are observed.

In an example, an optical structure for each eye of augmented reality eyewear can include: a distal arcuate reflector (e.g. concave transflective mirror); a first image display; a first proximal reflector, wherein light rays from the first image display are redirected by the first proximal reflector toward the distal arcuate reflector, and wherein a first plane is the plane which best fits the reflective surface of the first proximal reflector; a second image display; a second proximal reflector, wherein light rays from the second image display are redirected by the second proximal reflector toward the distal arcuate reflector, wherein a second plane is the plane which best fits the reflective surface of the second proximal reflector; and an actuator which changes the angle between (the intersection of virtual extensions of) the first and second planes. In an example, an optical structure for each eye of augmented reality eyewear can further comprise an actuator which rotates, tilts, and/or pivots a distal arcuate reflector (e.g. transflective mirror). In an example, a waveguide in an optical structure for each eye of augmented reality eyewear can be made with a metamaterial. In an example, an optical structure for each eye in augmented reality eyewear can also include a micromirror array. In an example, an optical structure for each eye of augmented reality eyewear can also include a Quasi Fresnel Reflector.

FIG. 1 shows an example of an optical structure for each eye of augmented reality eyewear comprising: a first image display (e.g. image source) 101 on a first side of a person's eye (e.g. above or to the right of a space directly in front of the eye); a second image display (e.g. image source) 102 on a second side of the eye (e.g. below or to the left of the space directly in front of the eye) which is opposite the first side of the eye, wherein light rays from the first image display and light rays from the second image display show one or more virtual objects in the person's field of view; a first waveguide (e.g. internal reflection prism) 103 which reflects light rays from the first image display multiple times before those light rays are directed toward the eye; and a second waveguide (e.g. internal reflection prism) 104 which reflects light rays from the second image display multiple times before those light rays are directed toward the eye, wherein light rays from the environment pass through the first waveguide and/or the second waveguide to reach the person's eye. In an example, a first side can be above (a space in directly in front of) an eye and a second side can be below (the space in directly in front of) an eye. In an example, a first side can be to the right of (a space in directly in front of) an eye and a second side can to the left of (the space in directly in front of) an eye.

In an example, a first waveguide (e.g. internal reflection prism) and a second waveguide (e.g. internal reflection prism) can at least partially overlap. In an example, a first waveguide (e.g. internal reflection prism) and a second waveguide (e.g. internal reflection prism) can overlap completely. In an example, all light beams from the environment to a person's eye which pass through a first waveguide also pass through a second waveguide. In an example, a first waveguide (e.g. internal reflection prism) and a second waveguide (e.g. internal reflection prism) can partially overlap. In an example, between 75% and 95% of light beams from the environment to a person's eye which pass through a first waveguide can also pass through a second waveguide. In an example, between 50% and 80% of light beams from the environment to a person's eye which pass through a first waveguide can also pass through a second waveguide. In an example, between 5% and 35% of light beams from the environment to a person's eye which pass through a first waveguide can also pass through a second waveguide.

In another example, a first waveguide (e.g. internal reflection prism) and a second waveguide (e.g. internal reflection prism) may not overlap. In an example, light beams from the environment to a person's eye which pass through a first waveguide do not pass through a second waveguide. In an example, a second waveguide can be symmetric to a first waveguide with respect to reflection across a plane through a center of the field of vision of an eye. In an example, first and second waveguides can be the same length and size, but span different portions (e.g. upper half and lower half, or right half and left half) of a field of vision of an eye.

In an example, a first waveguide can be distal (e.g. farther from an eye) relative to a second waveguide. In an example, a first waveguide and a second waveguide can both be the same distance from an eye. In an example, the centroid of a first waveguide and the centroid of a second waveguide can both be the same distance from an eye. In an example, a first waveguide and a second waveguide can be coplanar. In an example, a first waveguide and a second waveguide can be symmetric with respect to a plane through the center of the field of view of an eye and meet together in the center of the field of view of the eye.

In an example, a waveguide can be an internal reflection prism. In an example, a waveguide can have total internal reflection. In an example, a waveguide can be tapered in a peripheral to center (e.g. center of field of vision for an eye) direction. In an example, a waveguide can be arcuate and/or curved. In an example, a waveguide can have a first width in a portion of the waveguide which is closer to an image display and a second width in a portion of the waveguide which is farther from the image display (and closer to the center of the field of vision), wherein the second width is less than the first width. In an example, a waveguide can be a polygonal prism. In an example, a waveguide can be a polygonal prism with a triangular cross-sectional shape. In an example, a waveguide can have a wedge shape.

In an example, a first image display can be distal (e.g. farther from an eye) relative to a second image display. In an example, a first image display and a second image display can both be the same distance from an eye. In an example, the centroid of a first image display and the centroid of a second image display can both be the same distance from an eye. In an example, a first image display and a second image display can be coplanar. In an example, a first image display and a second image display can be symmetric with respect to a plane through the center of the field of view of an eye and meet together in the center of the field of view of the eye.

In an example, light beams from a first image display and light beams from a second image display can combine to show one or more virtual objects and/or scenes in a person's field of view. In an example, light beams from a first image display and light beams from a second image display can show different portions (e.g. upper and lower portions, or right and left portions) of the same virtual object and/or scene in a person's field of view. In an example, light beams from a first image display and light beams from a second image display can show different virtual objects and/or scenes in a person's field of view.

The optical structure shown in FIG. 1 can also be described as an optical structure for each eye of augmented reality eyewear comprising: a distal virtual image display (e.g. first image display and/or image source); a proximal virtual image display (e.g. second image display and/or image source); a distal internal-reflection waveguide (e.g. first waveguide and/or internal reflection prism); and a proximal internal-reflection waveguide (e.g. second waveguide and/or internal reflection prism); wherein light rays comprising a given pixel of an image from the distal virtual image display are reflected at least three times inside the distal internal-reflection waveguide before these light rays exit the distal internal-reflection waveguide to reach the person's eye; wherein light rays comprising a given pixel of an image from the proximal virtual image display are reflected at least three times inside the proximal internal-reflection waveguide before these light rays exit the proximal internal-reflection waveguide to reach the person's eye; wherein light rays from the distal virtual image display and the proximal virtual image display create images of virtual objects in the person's field of view; and wherein light rays from the environment pass through the distal internal-reflection waveguide and/or the proximal internal-reflection waveguide to reach the person's eye.

In an example, distal and proximal virtual image displays (e.g. first and second image displays and/or image sources) can be on opposite sides of a person's eye. In an example, a distal virtual image display can be above (a space in front of) a person's eye and a proximal virtual image display can be below (the space in front of) a person's eye. In an example, a distal virtual image display can be to the right of (a space in front of) a person's eye and a proximal virtual image display can be to the left of (the space in front of) a person's eye. Relevant variations discussed elsewhere in this disclosure or in priority-linked disclosures can also be applied to this example.

Figure 2:
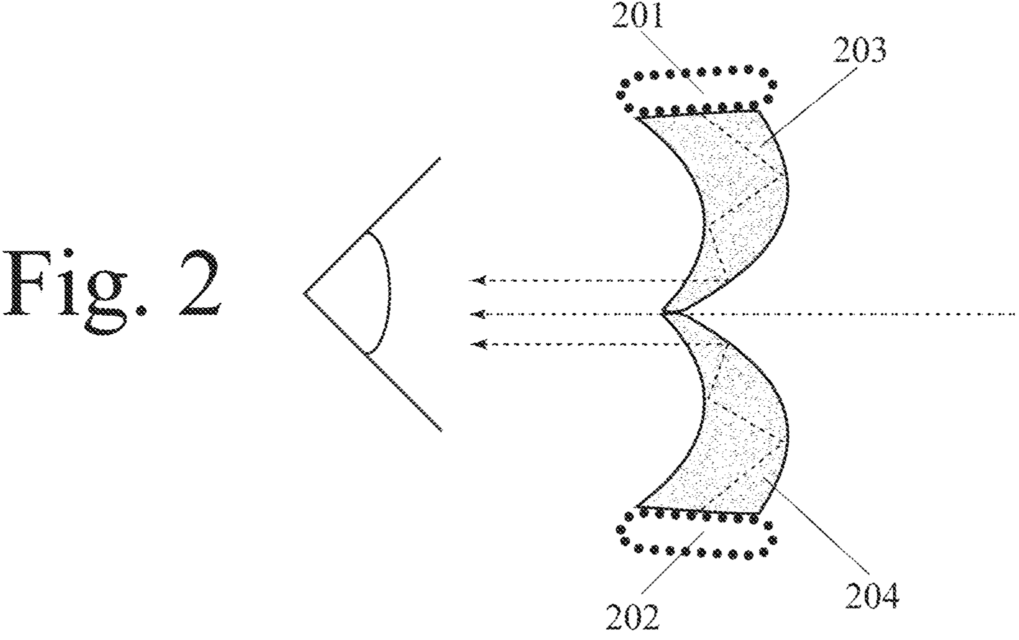
FIG. 2 shows an optical structure for each eye in augmented reality eyewear including two image displays and two non-overlapping waveguides.

FIG. 2 shows another example of an optical structure for each eye of augmented reality eyewear comprising: a first image display (e.g. image source) 201 on a first side of a person's eye (e.g. above or to the right of a space directly in front of the eye); a second image display (e.g. image source) 202 on a second side of the eye (e.g. below or to the left of the space directly in front of the eye) which is opposite the first side of the eye, wherein light rays from the first image display and light rays from the second image display show one or more virtual objects in the person's field of view; a first waveguide (e.g. internal reflection prism) 203 which reflects light rays from the first image display multiple times before those light rays are directed toward the eye; and a second waveguide (e.g. internal reflection prism) 204 which reflects light rays from the second image display multiple times before those light rays are directed toward the eye, wherein light rays from the environment pass through the first waveguide and/or the second waveguide to reach the person's eye. In an example, a first side can be above (a space in directly in front of) an eye and a second side can be below (the space in directly in front of) an eye. In an example, a first side can be to the right of (a space in directly in front of) an eye and a second side can to the left of (the space in directly in front of) an eye.

In an example, a first waveguide (e.g. internal reflection prism) and a second waveguide (e.g. internal reflection prism) may not overlap. In an example, light beams from the environment to a person's eye which pass through a first waveguide may not pass through a second waveguide. In an example, a second waveguide can be symmetric to a first waveguide with respect to reflection across a plane through a center of the field of vision of an eye. In an example, first and second waveguides can be the same length and size, spanning different halves (e.g. upper half and lower half, or right half and left half) of a field of vision of an eye.

In another example, a first waveguide (e.g. internal reflection prism) and a second waveguide (e.g. internal reflection prism) can at least partially overlap. In an example, the first waveguide (e.g. internal reflection prism) and the second waveguide (e.g. internal reflection prism) can overlap completely. In an example, all light beams from the environment to a person's eye which pass through the first waveguide can also pass through the second waveguide. In an example, the first waveguide (e.g. internal reflection prism) and the second waveguide (e.g. internal reflection prism) can partially overlap. In an example, between 75% and 95% of light beams from the environment to a person's eye which pass through the first waveguide can also pass through the second waveguide. In an example, between 50% and 80% of light beams from the environment to a person's eye which pass through the first waveguide can also pass through the second waveguide. In an example, between 5% and 35% of light beams from the environment to a person's eye which pass through the first waveguide can also pass through the second waveguide.

In an example, a first waveguide can be distal (e.g. farther from an eye) relative to a second waveguide. In an example, a first waveguide and a second waveguide can both be the same distance from an eye. In an example, the centroid of a first waveguide and the centroid of a second waveguide can both be the same distance from an eye. In an example, a first waveguide and a second waveguide can be coplanar. In an example, a first waveguide and a second waveguide can be symmetric with respect to a plane through the center of the field of view of an eye and meet together in the center of the field of view of the eye.

In an example, a waveguide can be an internal reflection prism. In an example, a waveguide can have total internal reflection. In an example, a waveguide can be tapered in a peripheral to center direction. In an example, a waveguide can be arcuate and/or curved. In an example, a waveguide can have a first width in a portion of the waveguide which is closer to an image display and a second width in a portion of the waveguide which is farther from the image display (and closer to the center of the field of vision), and wherein the second width is less than the first width. In an example, a waveguide can be a polygonal prism. In an example, a waveguide can be a polygonal prism with a triangular cross-sectional shape. In an example, a waveguide can have a wedge shape.

In an example, a first image display can be distal (e.g. farther from an eye) relative to a second image display. In an example, a first image display and a second image display can both be the same distance from an eye. In an example, the centroid of a first image display and the centroid of a second image display can both be the same distance from an eye. In an example, a first image display and a second image display can be coplanar. In an example, a first image display and a second image display can be symmetric with respect to a plane through the center of the field of view of an eye and meet together in the center of the field of view of the eye.

In an example, light beams from a first image display and light beams from a second image display can combine to show one or more virtual objects and/or scenes in a person's field of view. In an example, light beams from a first image display and light beams from a second image display can show different portions (e.g. upper and lower portions, or right and left portions) of the same virtual object and/or scene in a person's field of view. In an example, light beams from a first image display and light beams from a second image display can show different virtual objects and/or scenes in a person's field of view.

The optical structure shown in FIG. 2 can also be described as an optical structure for each eye of augmented reality eyewear comprising: a first virtual image display (e.g. first image display and/or image source); a second virtual image display (e.g. second image display and/or image source); a first internal-reflection waveguide (e.g. first waveguide and/or internal reflection prism); and a second internal-reflection waveguide (e.g. second waveguide and/or internal reflection prism); wherein light rays comprising a given pixel of an image from the first virtual image display are reflected at least three times inside the first internal-reflection waveguide before these light rays exit the first internal-reflection waveguide to reach the person's eye; wherein light rays comprising a given pixel of an image from the second virtual image display are reflected at least three times inside the second internal-reflection waveguide before these light rays exit the second internal-reflection waveguide in order to reach the person's eye; wherein light rays from the first virtual image display and the second virtual image display create images of virtual objects in the person's field of view.

In an example, first and second virtual image displays (e.g. first and second image displays and/or image sources) can be on opposite sides of a person's eye. In an example, a first virtual image display can be above (a space in front of) a person's eye and a second virtual image display can be below (the space in front of) a person's eye. In an example, a first virtual image display can be to the right of (a space in front of) a person's eye and a second virtual image display can be to the left of (the space in front of) a person's eye. Relevant variations discussed elsewhere in this disclosure or in priority-linked disclosures can also be applied to this example.

Figure 3:
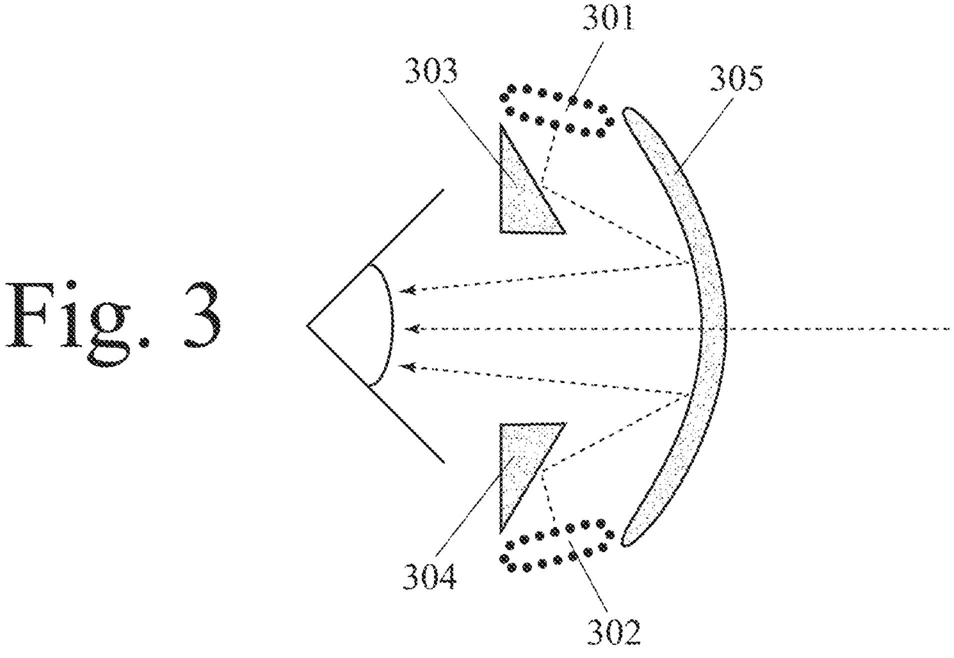
FIG. 3 shows an optical structure for each eye in augmented reality eyewear including two image displays, two proximal reflectors, and a distal arcuate reflector.

FIG. 3 shows an example of an optical structure for each eye of augmented reality eyewear comprising: a first image display (e.g. image source) 301 on a first side of a person's eye (e.g. above or to the right of a space directly in front of the eye); a second image display (e.g. image source) 302 on a second side of the eye (e.g. below or to the left of the space directly in front of the eye) which is opposite the first side of the eye, wherein light rays from the first image display and light rays from the second image display show one or more virtual objects in the person's field of view; a distal arcuate light reflector (e.g. concave partially-reflecting mirror) 305; a first reflecting prism 303 which reflects light rays from the first image display toward the distal arcuate light reflector, wherein the arcuate distal reflector at least partially reflects light rays from the first image display toward the person's eye; and a second reflecting prism 304 which reflects light rays from the second image toward the distal arcuate light reflector, wherein the arcuate distal reflector at least partially reflects light rays from the second image display toward the person's eye.

In an example, light beams from a first image display and light beams from a second image display can combine to show one or more virtual objects and/or scenes in a person's field of view. In an example, light beams from a first image display and light beams from a second image display can show different portions (e.g. upper and lower portions, or right and left portions) of the same virtual object and/or scene in a person's field of view. In an example, light beams from a first image display and light beams from a second image display can show different virtual objects and/or scenes in a person's field of view.

The optical structure shown in FIG. 3 can also be described as an optical structure for each eye of augmented reality eyewear comprising: (an array of) light emitters (e.g. image displays 301 and 302) which emit light rays in a radially-inward direction toward a near-eye area; reflectors (e.g. reflecting prisms 303 and 304) which receive light rays from the light emitters and redirect these light rays away from a person's eye; and an arcuate light reflector (e.g. arcuate distal reflector 305) which at least partially reflects these light rays toward the person's eye. Relevant variations discussed elsewhere in this disclosure or in priority-linked disclosures can also be applied to this example.

Figure 4:
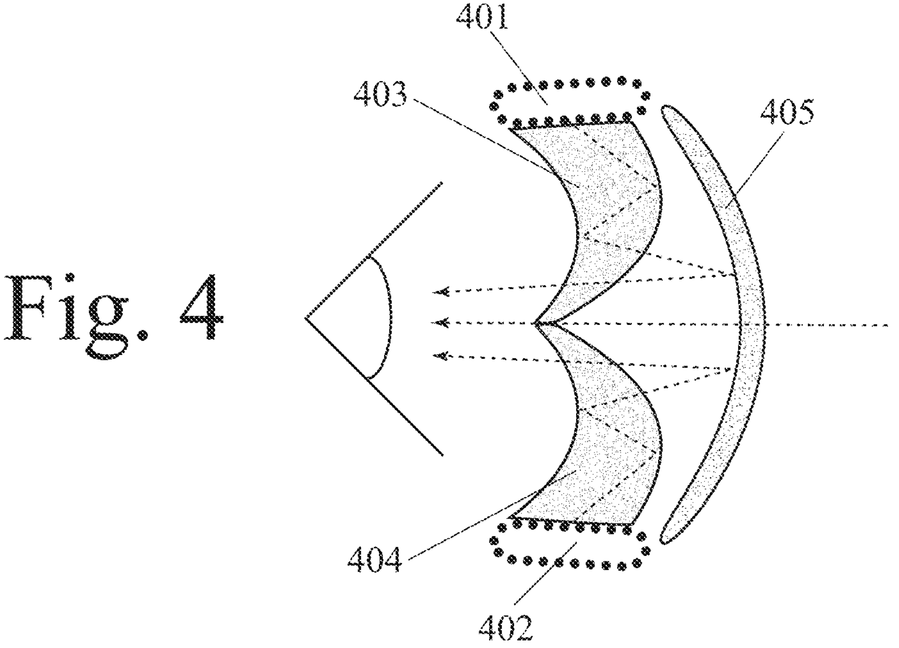
FIG. 4 shows an optical structure for each eye in augmented reality eyewear including two image displays, two non-overlapping waveguides, and a distal arcuate reflector.

FIG. 4 shows an example of an optical structure for each eye of augmented reality eyewear comprising: a first image display (e.g. image source) 401 on a first side of a person's eye (e.g. above or to the right of a space directly in front of the eye); a second image display (e.g. image source) 402 on a second side of the eye (e.g. below or to the left of the space directly in front of the eye) which is opposite the first side of the eye, wherein light rays from the first image display and light rays from the second image display show one or more virtual objects in the person's field of view; an arcuate distal reflector 405; a first waveguide (e.g. internal reflection prism) 403 which reflects light rays from the first image display multiple times before those light rays are directed toward the arcuate distal reflector, wherein the arcuate distal reflector at least partially reflects light rays from the first image display toward the eye; and a second waveguide (e.g. internal reflection prism) 404 which reflects light rays from the second image display multiple times before those light rays are directed toward the arcuate distal reflector; wherein the arcuate distal reflector at least partially reflects light rays from the first image display toward the eye.

In an example, the first waveguide (e.g. internal reflection prism) and the second waveguide (e.g. internal reflection prism) do not overlap. In an example, light beams from the environment to a person's eye which pass through the first waveguide do not pass through the second waveguide. In an example, a second waveguide can be symmetric to a first waveguide with respect to reflection across a plane through a center of the field of vision of an eye. In an example, first and second waveguides can be the same length and size, spanning different halves (e.g. upper half and lower half, or right half and left half) of a field of vision of an eye.

In another example, a first waveguide (e.g. internal reflection prism) and a second waveguide (e.g. internal reflection prism) can at least partially overlap. In an example, the first waveguide (e.g. internal reflection prism) and the second waveguide (e.g. internal reflection prism) overlap completely. In an example, all light beams from the environment to a person's eye which pass through the first waveguide also pass through the second waveguide. In an example, the first waveguide (e.g. internal reflection prism) and the second waveguide (e.g. internal reflection prism) can partially overlap. In an example, between 75% and 95% of light beams from the environment to a person's eye which pass through the first waveguide also pass through the second waveguide. In an example, between 50% and 80% of light beams from the environment to a person's eye which pass through the first waveguide also pass through the second waveguide.

In an example, a first waveguide can be distal (e.g. farther from an eye) relative to a second waveguide. In an example, a first waveguide and a second waveguide can both be the same distance from an eye. In an example, the centroid of a first waveguide and the centroid of a second waveguide can both be the same distance from an eye. In an example, a first waveguide and a second waveguide can be coplanar. In an example, a first waveguide and a second waveguide can be symmetric with respect to a plane through the center of the field of view of an eye and meet together in the center of the field of view of the eye.

In an example, a waveguide can be an internal reflection prism. In an example, a waveguide can be a total internal reflection prism. In an example, a waveguide can be tapered in a peripheral to center direction. In an example, a waveguide can be arcuate and/or curved. In an example, a waveguide can have a first width in a portion of the waveguide which is closer to an image display and a second width in a portion of the waveguide which is farther from the image display (and closer to the center of the field of vision), and wherein the second width is less than the first width. In an example, a waveguide can be a polygonal prism. In an example, a waveguide can be a polygonal prism with a triangular cross-sectional shape. In an example, a waveguide can have a wedge shape.

In an example, a first image display can be distal (e.g. farther from an eye) relative to a second image display. In an example, a first image display and a second image display can both be the same distance from an eye. In an example, the centroid of a first image display and the centroid of a second image display can both be the same distance from an eye. In an example, a first image display and a second image display can be coplanar. In an example, a first image display and a second image display can be symmetric with respect to a plane through the center of the field of view of an eye and meet together in the center of the field of view of the eye.

In an example, light beams from a first image display and light beams from a second image display can combine to show one or more virtual objects and/or scenes in a person's field of view. In an example, light beams from a first image display and light beams from a second image display can show different portions (e.g. upper and lower portions, or right and left portions) of the same virtual object and/or scene in a person's field of view. In an example, light beams from a first image display and light beams from a second image display can show different virtual objects and/or scenes in a person's field of view. Relevant variations discussed elsewhere in this disclosure or in priority-linked disclosures can also be applied to this example.

Figures 5, 6:
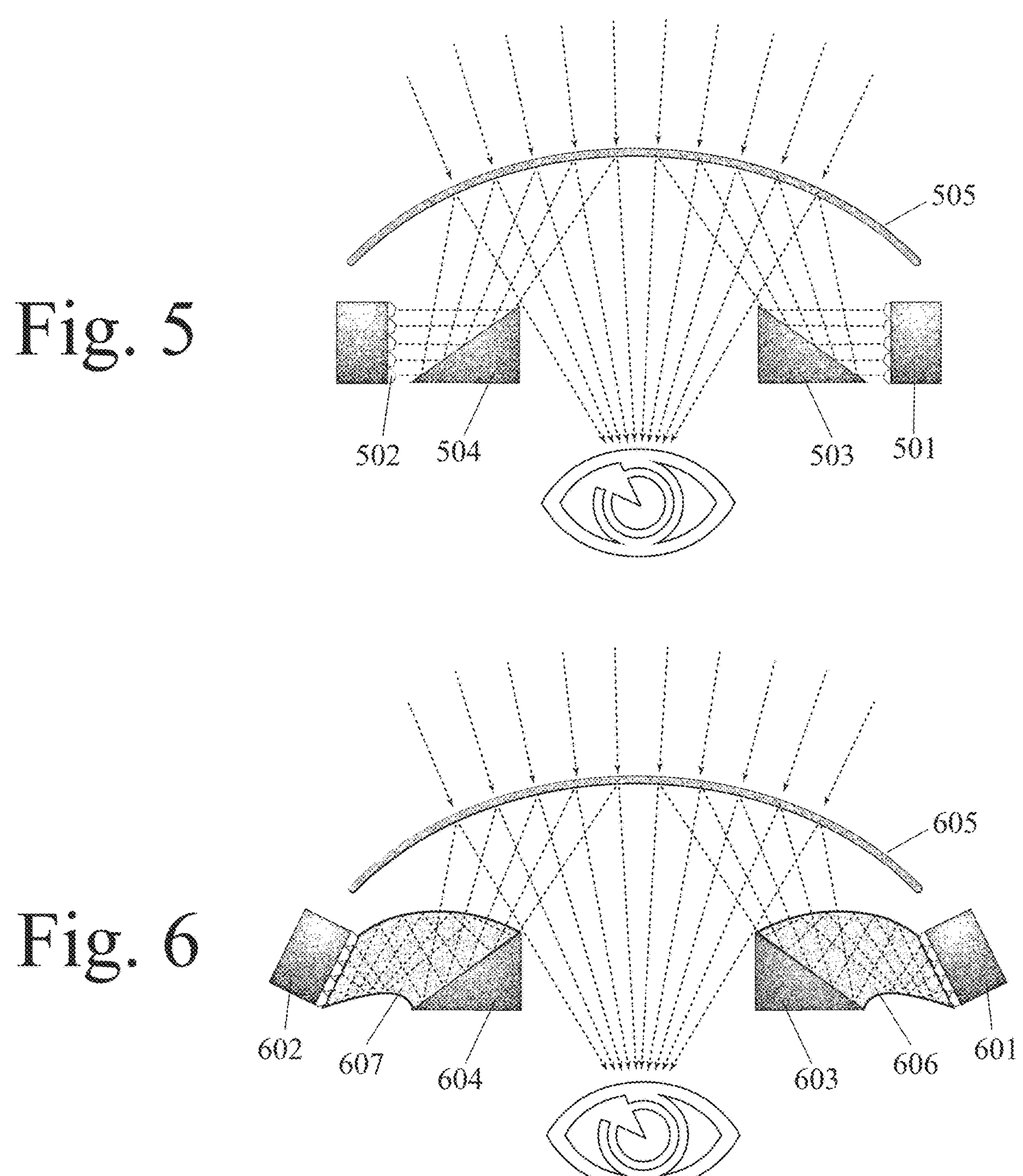
FIG. 5 shows another view of an example of an optical structure for each eye in augmented reality eyewear including two image displays, two proximal reflectors, and a distal arcuate reflector.
FIG. 6 shows another view of an example of an optical structure for each eye in augmented reality eyewear including two image displays, two non-overlapping waveguides, and a distal arcuate reflector.

FIG. 5 shows a cross-sectional view of an optical structure for an eye of augmented reality eyewear comprising: a distal arcuate reflector (e.g. a concave transflective mirror) 505; a first image display 501 on a first side of an eye (e.g. above a space in front of an eye or to the right of the space); a first proximal reflector (e.g. a first reflective prism) 503, wherein light rays from the first image display are reflected by the first proximal reflector toward the distal arcuate reflector and then reflected by the distal arcuate reflector toward the eye; a second image display 502 on a second side of an eye which is opposite the first side of the eye (e.g. below the space in front of the eye or to the left of the space in front of the eye); and a second proximal reflector (e.g. a second reflective prism) 504, wherein light rays from the second image display are reflected by the second proximal reflector toward the distal arcuate reflector and then reflected by the distal arcuate reflector toward the eye.

In an example, light rays from the first image display and the second image display can combine (e.g. piece together or overlap) to display one or more virtual objects in the field of view of the eye. In an example, the first side can be above (a space in front of) the eye and the second side can be below (the space in front of) the eye. In an example, the first side can be to the right of (a space in front of) the eye and the second side can be to the left of (the space in front of) the eye. In an example, the proximal reflectors can be polygonal prisms (e.g. with triangular or quadrilateral cross-sectional shapes). In an example, light rays from the (first and second) image displays can be externally reflected by the walls of the (first and second, respectively) proximal reflectors. In an example, light rays from the (first and second) image displays can be internally reflected (e.g. multiple times) by the walls of the (first and second, respectively) proximal reflectors.

As shown in FIG. 5, in an example, an optical structure for each eye of augmented reality eyewear can comprise: a distal arcuate reflector (e.g. a concave transflective mirror); a first image display on a first side of an eye (e.g. above a space in front of an eye or to the right of the space); a first proximal reflector (e.g. a first reflective prism), wherein light rays from the first image display are reflected by the first proximal reflector toward the distal arcuate reflector and then reflected by the distal arcuate reflector toward the eye; a second image display on a second side of an eye which is opposite the first side of the eye (e.g. below the space in front of the eye or to the left of the space in front of the eye); and a second proximal reflector (e.g. a second reflective prism), wherein light rays from the second image display are reflected by the second proximal reflector toward the distal arcuate reflector and then reflected by the distal arcuate reflector toward the eye. Relevant variations discussed elsewhere in this disclosure or in priority-linked disclosures can also be applied to this example.

FIG. 6 shows a cross-sectional view of an optical structure for an eye of augmented reality eyewear comprising: a distal arcuate reflector (e.g. a concave transflective mirror) 605; a first image display 601 on a first side of an eye (e.g. above a space in front of an eye or to the right of the space); a first proximal waveguide (e.g. internal reflection prism) 606; a first proximal reflector (e.g. a first reflective prism) 603; a second image display 602 on a second side of an eye which is opposite the first side of the eye (e.g. below the space in front of the eye or to the left of the space in front of the eye); a second proximal waveguide (e.g. internal reflection prism) 607; and a second proximal reflector (e.g. a second reflective prism) 604; wherein light rays from the first image display are internally-reflected multiple times within the first waveguide before being reflected by the first proximal reflector toward the distal arcuate reflector and then reflected by the distal arcuate reflector toward the eye; and wherein light rays from the second image display are internally-reflected multiple times within the second waveguide before being reflected by the second proximal reflector toward the distal arcuate reflector and then reflected by the distal arcuate reflector toward the eye.

In an example, light rays from the first image display and the second image display can combine (e.g. piece together or overlap) to display one or more virtual objects in the field of view of the eye. In an example, the first side can be above (a space in front of) the eye and the second side can be below (the space in front of) the eye. In an example, the first side can be to the right of (a space in front of) the eye and the second side can be to the left of (the space in front of) the eye. In an example, the proximal reflectors can be polygonal prisms (e.g. with triangular or quadrilateral cross-sectional shapes). In an example, the waveguides can be polygonal prisms (e.g. with triangular or quadrilateral cross-sectional shapes). In an example, light rays from the (first and second) image displays can be internally reflected (e.g. multiple times) by the walls of the (first and second, respectively) waveguides. In an example, light rays from the (first and second) image displays can be externally reflected by the walls of the (first and second, respectively) proximal reflectors. In an example, a waveguide and a proximal reflector on a given side can be contiguous to each other.

As shown in FIG. 6, in an example, a cross-sectional view of an optical structure for an eye of augmented reality eyewear can comprise: a distal arcuate reflector (e.g. a concave transflective mirror); a first image display on a first side of an eye (e.g. above a space in front of an eye or to the right of the space); a first proximal waveguide (e.g. internal reflection prism); a first proximal reflector (e.g. a first reflective prism); a second image display on a second side of an eye which is opposite the first side of the eye (e.g. below the space in front of the eye or to the left of the space in front of the eye); a second proximal waveguide (e.g. internal reflection prism); and a second proximal reflector (e.g. a second reflective prism); wherein light rays from the first image display are internally-reflected multiple times within the first waveguide before being reflected by the first proximal reflector toward the distal arcuate reflector and then reflected by the distal arcuate reflector toward the eye; and wherein light rays from the second image display are internally-reflected multiple times within the second waveguide before being reflected by the second proximal reflector toward the distal arcuate reflector and then reflected by the distal arcuate reflector toward the eye. Relevant variations discussed elsewhere in this disclosure or in priority-linked disclosures can also be applied to this example.

I claim:

1. An optical structure for each eye of augmented reality eyewear comprising:

a first image display on a first side of a person's eye;

a second image display on a second side of the eye which is opposite the first side of the eye, wherein light rays from the first image display and light rays from the second image display show one or more virtual objects in the person's field of view;

a first waveguide which reflects light rays from the first image display multiple times before those light rays are directed toward the eye; and a second waveguide which reflects light rays from the second image display multiple times before those light rays are directed toward the eye, wherein at least one of the first and second waveguides are tapered, wherein light rays from the environment pass through the first waveguide and/or the second waveguide to reach the eye, and wherein between 30% and 60% of the first waveguide and the second waveguide overlap from a distal-to-proximal perspective.

2. The optical structure in claim 1 wherein the first side is above the eye and the second side is below the eye.

3. The optical structure in claim 1 wherein the first side is to the right of the eye and the second side is to the left of the eye.

4. The optical structure in claim 1 wherein light beams from a first image display and light beams from a second image display combine to show one or more virtual objects and/or scenes in the person's field of view.

5. The optical structure in claim 1 wherein light beams from a first image display and light beams from a second image display show different virtual objects and/or scenes in the person's field of view.

6. An optical structure for each eye of augmented reality eyewear comprising:

a distal virtual image display;

a proximal virtual image display;

a distal internal-reflection waveguide; and a proximal internal-reflection waveguide;

wherein at least one of the distal internal-reflection waveguide and proximal internal-reflection waveguide are tapered, wherein light rays comprising a given pixel of an image from the distal virtual image display are reflected multiple times inside the distal internal-reflection waveguide before these light rays exit the distal internal-reflection waveguide;

wherein light rays comprising a given pixel of an image from the proximal virtual image display are reflected multiple times inside the proximal internal-reflection waveguide before these light rays exit the proximal internal-reflection waveguide;

wherein light rays from the distal virtual image display and the proximal virtual image display create images of virtual objects in the person's field of view; and wherein light rays from the environment pass through the distal internal-reflection waveguide and/or the proximal internal-reflection waveguide to reach a person's eye; and wherein between 50% and 80% of light beams from the environment to a person's eye which pass through a first waveguide also pass through a second waveguide.

7. The optical structure in claim 6 wherein the distal image display is above the eye and the proximal image display is below the eye, or vice versa.

8. The optical structure in claim 6 wherein the distal image display is to the right of the eye and the proximal image display is to the left of the eye, or vice versa.

9. The optical structure in claim 6 wherein light beams from a distal image display and light beams from a proximal image display combine to show one or more virtual objects and/or scenes in the person's field of view.

10. The optical structure in claim 6 wherein light beams from a distal image display and light beams from a proximal image display show different virtual objects and/or scenes in the person's field of view.

* * * * *